US011776359B2

(12) United States Patent
Berman

(10) Patent No.: US 11,776,359 B2
(45) Date of Patent: Oct. 3, 2023

(54) GAMING DEVICES AND METHODS FOR ENHANCING FUTURE GAMING EVENTS

(71) Applicant: KING SHOW GAMES, INC., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 173 days.

(21) Appl. No.: 16/683,812

(22) Filed: Nov. 14, 2019

(65) Prior Publication Data

US 2020/0152014 A1 May 14, 2020

Related U.S. Application Data

(60) Provisional application No. 62/767,132, filed on Nov. 14, 2018.

(51) Int. Cl.
*A63F 13/00* (2014.01)
*G07F 17/32* (2006.01)

(52) U.S. Cl.
CPC ...... *G07F 17/3267* (2013.01); *G07F 17/3293* (2013.01)

(58) Field of Classification Search
CPC ............. G07F 17/3267; G07F 17/3211; G07F 17/3293; G07F 17/3288; G07F 17/3272
See application file for complete search history.

(56) References Cited

U.S. PATENT DOCUMENTS

| | | | | |
|---|---|---|---|---|
| 2002/0125642 A1* | 9/2002 | Wells | A63F 3/00157 273/292 |
| 2002/0153662 A1* | 10/2002 | Webb | A63F 3/00157 273/292 |
| 2008/0167118 A1* | 7/2008 | Kroeckel | G07F 17/3293 463/31 |
| 2011/0092262 A1* | 4/2011 | Naicker | G07F 17/32 463/13 |

OTHER PUBLICATIONS

Fantini Research, "Fantini's 2018 Pre-G2E Guide", dated Oct. 2, 2018, 3 pages.
Liquid & Grit, "Slot Design Report: G2E Edition", dated Oct. 13, 2018, 3 pages.
Set Things, "Ace Invaders", Printed, Mar. 5, 2020, 1 page.

* cited by examiner

*Primary Examiner* — David L Lewis
*Assistant Examiner* — Eric M Thomas

(57) ABSTRACT

Systems, apparatuses and methods for designating game indicia locations during current gaming events to enhance game indicia at the identified positions in subsequent gaming events. In a poker context, card positions in a first poker game may be randomly selected, and if any are randomly selected, enhanced cards are repeatedly provided in periodic or random intervals of subsequent poker games at corresponding card positions until a termination event occurs.

20 Claims, 14 Drawing Sheets

GAMING DEVICES AND METHODS FOR ENHANCING FUTURE GAMING EVENTS

FIELD

This disclosure relates generally to games, and more particularly to systems, apparatuses and methods for identifying game indicia locations during current gaming events to enhance game indicia at the identified positions in subsequent gaming events.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is due to the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes systems, apparatuses and methods that facilitate new and interesting gaming experiences, and provide advantages over the prior art.

SUMMARY

The present disclosure is directed to systems, apparatuses, computer-readable media, and/or methods that are configured to identify positions for game play in a first gaming event, and enhance the game play items presented at those identified positions in a subsequent gaming event.

This disclosure relates generally to games, and more particularly to systems, apparatuses and methods for identifying game indicia locations during current gaming events to enhance game indicia at the identified positions in subsequent gaming events.

In one embodiment, the gaming events involve hands of cards, such as hands of poker, where one or more positions is tagged or otherwise identified in connection with play of the gaming event. The identified position(s) is recognized in one or more subsequent gaming events, such as every X poker hands, whereby the identified position(s) is populated with a symbol that may be a better card value and/or more versatile than what may have otherwise been dealt to that position(s). For example, a wild card may be provided at the identified positions on every hand, or every Nth hand, or randomly for future hands.

In one poker context, card positions in a first poker game may be randomly selected, and if any are randomly selected, enhanced cards are repeatedly provided in periodic or random intervals of subsequent poker games at corresponding card positions until a termination event occurs.

In one embodiment, a gaming apparatus is provided for facilitating player participation in electronic poker games, which includes a display, digital storage, a user interface configured to receive at least player input to facilitate player participation in the poker game, a wager input device structured to identify and validate player assets and to permit the player to participate in the electronic poker games in which the player assets are provided, and a processor. In this embodiment, the processor is configured to randomly select cards to present in a first poker hand, randomly designate a card position(s) of a corresponding one(s) of the randomly selected cards in the first poker hand, to store the location of the randomly designated card position(s), and to facilitate the player's completion of participation of the first poker hand. The processor is further configured to facilitate the player's participation in a number (N) of intermediate poker hands, and identify a benefit-receiving poker hand to be N+1 poker hands after the first poker hand in which the card position was randomly designated. The processor provides an enhanced card at the stored location of the randomly designated card position in the benefit-receiving poker hand, and facilitate player's participation to completion of the benefit-receiving poker hand using the enhanced card.

In a more particular embodiment of such a gaming apparatus, the processor is configured to repeatedly provide the enhanced card at the stored location of the randomly designated card position on every N+1 poker hands. Thus, in such embodiments, providing the enhanced card(s) repeats periodically. In still more particular embodiments, the processor is configured to discontinue repeatedly providing the enhanced card in response to occurrence of a termination event.

The processor of such a gaming apparatus is configured, in one embodiment, to facilitate player's participation in the N intermediate poker hands while providing no enhanced card at the card position randomly designated during play of the first poker hand.

In one embodiment of the gaming apparatus, the processor is further configured to randomly designate one or more additional card positions of respective randomly selected cards in the first poker hand, store locations for the additional card position(s), provide an additional enhanced card(s) at the stored locations of the randomly designated additional card positions in the benefit-receiving poker hand, and enable the player to complete the benefit-receiving poker hand using the enhanced card and the additional enhanced card(s). In a more particular embodiment, the processor is configured to repeatedly provide the enhanced card and the additional enhanced card(s) at their respective randomly designated card position and the randomly designated additional card position(s) on every N+1 poker hands.

In another embodiment of such a gaming apparatus, the processor is configured to facilitate player participation in the number (N) of intermediate poker hands by facilitating player participation in a fixed number of intermediate poker hands, and repeatedly and periodically provide the enhanced card at the stored location of the randomly designated card position, after every fixed number of intermediate poker hands, until an occurrence of a termination event. In an alternative embodiment of such a gaming apparatus, the processor is configured to facilitate player participation in the number (N) of intermediate poker hands by facilitating player participation in a random number of intermediate poker hands. and repeatedly provide the enhanced card at the stored location of the randomly designated card position, after every random number of intermediate poker hands, until an occurrence of a termination event.

In another embodiment of the gaming apparatus, the processor is configured to randomly designate the card position of one of the randomly selected cards in the first poker hand at any time during play of the first poker hand ranging from a point prior to the cards being presented in the first poker hand through a point after the player has completed play of the first poker hand.

In still another embodiment of such a gaming apparatus, the processor is configured to provide a wild card as the enhanced card at the stored location of the randomly designated card position in the benefit-receiving poker hand, and to facilitate the player's participation to completion of the benefit-receiving poker hand using the wild card.

Another embodiment of such a gaming apparatus involves the processor additionally providing the enhanced card to the randomly designated card position of the first poker hand. In accordance with another embodiment, a gaming apparatus is provided for facilitating player participation in electronic poker games, which includes a display, a user interface configured to receive at least player input to facilitate player participation in the poker game, a wager input device structured to identify and validate player assets and to permit the player to participate in the electronic poker games in which the player assets are provided, and a processor. The processor is configured to randomly select cards to present in a first multi-hand poker game where a plurality of poker hands are concurrently played. The processor is configured to randomly select zero, one or more card positions of the plurality of poker hands of the first multi-hand poker game. If one or more card positions of the plurality of poker hands of the first multi-hand poker game was randomly selected, the processor repeatedly provides enhanced cards at the one or more randomly selected card positions for non-consecutive subsequent multi-hand poker games. The processor is configured to discontinue the repeated providing of the enhanced cards in response to a termination condition being met.

In one embodiment of such a gaming apparatus, the processor is configured to, repeatedly provide enhanced cards at the card positions of the plurality of poker hands every Nth multi-hand poker game (where N is greater than one), if any card positions of the plurality of poker hands of the first multi-hand poker game were randomly selected.

According to another embodiment, if one or more card positions of the plurality of poker hands of the first multi-hand poker game were randomly selected, the processor is configured to repeatedly provide enhanced cards at the card positions of the poker hands of the non-consecutive subsequent multi-hand poker games with a random number of intermediate multi-hand poker games between those of the multi-hand poker games receiving the enhanced cards, until the termination condition is met.

In accordance with another embodiment of such a gaming apparatus, the processor is configured to additionally provide the enhanced cards to the randomly selected card positions of the plurality of poker hands of the first multi-hand poker game.

In another embodiment, the processor is configured to provide wild cards as the enhanced cards at the one or more randomly selected card positions.

In still another embodiment of the gaming apparatus, at least the first multi-poker game and the non-consecutive subsequent multi-hand poker games involve multi-play poker games where the cards held by the player for one of the poker hands are replicated into the remaining poker hands, and the cards that were not held or replicated are discarded in favor of replacement cards.

In another embodiment, the termination condition comprises a random termination indication. In still another embodiment, the termination condition comprises a condition based on the player's play of at least the subsequent poker games.

In still another embodiment of such a gaming apparatus, the processor is configured to randomly select zero, one or more card positions of the plurality of poker hands of the first multi-hand poker game at any time during play of the first multi-hand poker game, ranging from before the cards are presented in the first multi-hand poker game through completion of play of the first multi-hand poker game.

This summary serves as an abbreviated, selective introduction of a representative subset of various concepts and embodiments that are further described or taught to those skilled in the art in the Specification herein. This summary is not intended to refer to all embodiments, scopes, or breadths of claims otherwise supported by the Specification, nor to identify essential features of the claimed subject matter, nor to limit the scope of the claimed subject matter.

DETAILED DESCRIPTION

Figure 1:
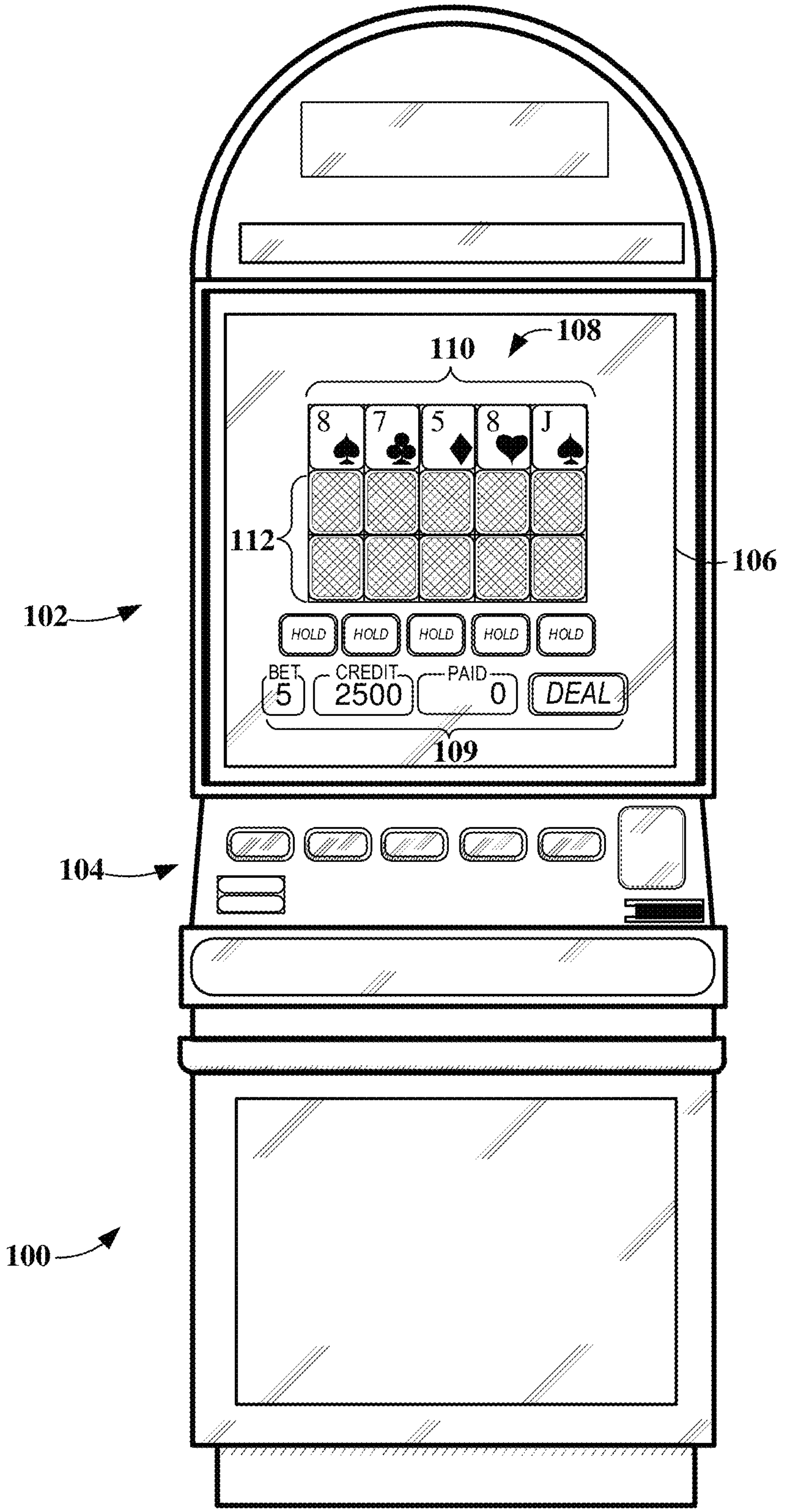
FIG. 1 is a diagram of a representative gaming machine capable of facilitating player use and interaction with games and features in accordance with the invention and representative embodiments described herein.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatuses.

In various embodiments, the gaming displays are described in conjunction with the use of data in the form of "symbols." In the context of this disclosure, a "symbol" may generally refer at least to a collection of one or more arbitrary indicia or signs that have some conventional or defined significance. In particular, the symbol may represent values that can at least be used to determine whether to award a payout. A symbol may include numbers, letters, shapes, pictures, textures, colors, sounds, etc., and any combination therebetween. A play state, such as a win, can be determined by comparing the symbol with one or more other symbols. Such comparisons can be performed, for example, via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are disclosed for identifying game positions that will be awarded with enhanced game play items on subsequent gaming events. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. poker, such as video poker) is provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to identify game indicia locations during current gaming events to enhance game indicia at the identified positions in subsequent gaming events.

For example, in one embodiment, one or more card positions in single-hand or multiple-hand poker games may be randomly identified. In connection with the play of one or more later poker hands, cards at those identified card positions may be set or changed to a card that is potentially better in the sense that it will, or is more likely to, increase the chances of a winning poker hand(s), and/or increase the chances of a better poker hand(s), and/or increase any payouts associated therewith, etc. The card positions may be randomly selected at random times, or may be randomly selected at known or partially-known times (e.g., every hand; at least once per 5 hands, etc.), or the positions may be identified based on other criteria (e.g., where an Ace is played, or either of the first 2 cards, etc.) while the times are random, etc. In some embodiments, the identified card positions are made available every Nth subsequent hand for a card upgrade. For example, when a card position is identified in a current poker hand, that card position may be upgraded to a wild card every $5^{th}$ hand. That may continue until some termination event occurs, such as the particular player stops playing, or it has been awarded some number of times (e.g., every $5^{th}$ hand for three occurrences), or until some event occurs (e.g., the player does not bet max, or does not make a side bet, or another card position is identified, etc.).

The disclosure herein is described primarily in the context of card games, and particularly poker games, but the principles described herein are applicable to any poker game, slot game, keno game, bingo game, and/or other game of chance where gaming indicia may be positioned at locations where subsequent gaming events utilize those common locations.

Thus, embodiments described herein involve, among other things, games where locations are marked in some manner, and the player is rewarded on at least one future game. In the context of one poker game embodiment, card positions are marked, and every X games an enhanced card, payout enhancement, beneficial feature, and/or other advantage to the player is provided. The cards at the card positions in the future hands may be wild cards, wild cards with multipliers, multipliers or other payout modifiers (e.g., associated with the cards dealt to those positions), cards involved in special features such as card duplication, split cards, or the like. The triggering event may be set as desired, such as a mystery trigger, or sub-symbol on dealt cards, or particular cards that may be dealt (e.g., any Ace, or the Ace of Spades, or any Two, or when a card comes up that the player has elected to serve as the trigger, etc.).

Betting structure may be done as desired, whereby the cost to participate in the enhancement features described herein may be built into the normal cost per hand or per game, or may involve an additional single wager, or may involve an additional wager per hand played, etc. In one example, a wager to play a poker hand may be five credits, and an additional one credit is paid to participate in the enhancement features described herein, or an additional one credit per hand may be involved to participate in the enhancement features. In other embodiments, the player may purchase one or more positions to provide the card enhancement features on future hands, such as paying X credits for a card position in the first hand to provide an enhanced card/feature in some number of future hands. Any credit structure desired to accommodate the math to provide payouts at the desired rate may be employed.

For example, in one representative example, a single hand of video poker may involve a player bet of five credits for the hand play, and five credits for participation in the card enhancement feature. A sub-symbol or other indicator may randomly occur on one or more cards to mark its/their respective location(s), and every five games those locations present Wild cards that are available as any card (or any card of a designated subset of available cards). In one embodiment, every card in the hand has a chance to have the indicating sub-symbol presented thereon. In other embodiments, there may be criteria to limit which car positions may be awarded such sub-symbol. In still other embodiments, the availability of sub-symbols at locations may be dependent on other factors, such as the card dealt to particular positions, such as providing the sub-symbol at locations where certain card ranks (e.g., Jacks, etc.) and/or card suits are presented.

Another representative example involves a multi-hand draw poker format, such as where an initial hand is dealt, and cards held in the initial hand are replicated into the other hands, whereby non-held and non-replicated cards are then drawn to form final hands. For example, in a triple-play version, three hands would be dealt, where the player would hold cards in one of those hands that would be replicated in the other hands. A representative betting structure may be, for example, a 5+5 structure for a total of thirty credits (e.g., five credits to play each of the three hands, plus five credits to be eligible for the card enhancement feature for each of the three hands). A representative example of playing such a triple-play version might be, for example, to use sub-symbols on cards to mark their respective card positions (or card positions pointed to or otherwise specified by those sub-symbols or other indicators). Every five games, for example, those card positions could be populated with Wild cards, or Wild cards with payout modifiers (e.g., a Wild card with 5X multiplier), etc.

Another representative example again involves a multi-hand draw poker format, such as triple-play poker. A representative betting structure may be, for example, a 5+5 structure for a total of thirty credits. A representative example of playing such a triple-play version might be, for example, to use a mystery trigger, where card positions are identified in some manner. A green halo, or other identifying feature(s) may mark the particular card position(s) that the mystery trigger identified, and every five games those card positions could be populated with Wild cards, or Wild cards with payout modifiers, etc. In other examples, it could be every ten games where those highlighted card positions are awarded with Wild or other beneficial cards/features to the player, or any desired spacing of games in which to award the benefitting card/feature at the respective card position.

Another representative example again involves a multi-hand draw poker format, such as triple-play poker, where the betting structure could again be a 5+5 structure for a total of thirty credits. A representative example of playing such a triple-play version might be, for example, to use a particular card, such as any Ace, to trigger that card position for future benefit. Thus, every time the player obtains an Ace, its location would get marked/highlighted to indicate it as a card position that will later receive the benefit, such as Wild cards, multipliers, Wild cards with multipliers, split cards (e.g., multiple cards at a single location), etc. A green halo, or any other identifying feature(s) may mark the particular card position(s) that the card identified, and every seven games (for example) those card positions could be populated with the beneficial card/feature.

Another representative example again involves a multi-hand draw poker format, such as triple-play poker, where the betting structure could again be a 5+5 structure for a total of thirty credits. A representative example of playing such a triple-play version might be, for example, to again use a particular card, such as any Ace, to trigger that card position for future benefit. In future hands, such as every seven games, those highlighted card positions could be populated with Aces (or whatever the card was that triggered the card position in the first place, or any desired card).

Numerous variations are possible in view of these and other embodiments of the inventive concept. Representative embodiments and variations are described herein, with some embodiments described with reference to the drawings. However, many other embodiments and variations exist that are covered by the principles and scope of this concept. For example, although some of the embodiments discussed below involve electronic/video poker examples of this concept, other embodiments include application of these inventive techniques in of slot games, other card games, roulette, bingo, or other games of chance. Some of these other types of embodiments will be discussed below as variations to the examples illustrated. However, many other types of games can implement similar techniques and fall within the scope of this disclosed concept.

Referring to the example gaming apparatus 100 shown in FIG. 1, the representative gaming apparatus includes at least a display area(s) 102 (also referred to as a gaming display), and a player interface area(s) 104, although some or all of the interactive mechanisms included in the user interface area 104 may be provided via other or additional means, such as graphical icons used with a touch screen in the display area 102 in some embodiments. The display area 102 may include one or more game displays 106 (also referred to as "displays" or "gaming displays") that may be included in physically separate displays or as portions of a common large display. Here, the representative game display 106 includes at least a primary game play portion 108 that displays game elements and symbols 110, and an operations portion 109 that can include meters, various game buttons and other input mechanisms, and/or other game information for a player of the gaming device 100.

The user interface 104 allows the user to control, engage in play of, and otherwise interact with the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, touchscreen input, tactile input, and/or any other user input system or mechanism that allows the user to play and interact with the particular gaming activity.

The user interface 104 may allow the user or player to enter coins, bills, or otherwise obtain credits through vouchers, tokens, credit cards, tickets, electronic money, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player information, such as player loyalty information to identify a user or player of the gaming device. This mechanism may be, for example, a card reader, biometric scanner, keypad, or other input device. It is through a user interface such as the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The game display 106 in the display area 102 may include one or more of an electronic display, a video display, a mechanical display, and fixed display information, such as pay table information associated with a glass/plastic panel(s) on the gaming machine 100 and/or graphical images. The symbols or other indicia associated with the play of the game may be presented on an electronic display device or on mechanical devices associated with a mechanical display. Generally, in some embodiments, the display 106 devotes the largest portion of viewable area to the primary gaming portion 108. The primary gaming portion 108 may provide visual feedback to the user for any selected game. The primary gaming portion 108 may render graphical objects such as cards, slot reels, dice, animated characters, and any other gaming visual known in the art. The primary gaming portion 108 may also inform players of the outcome of any particular event, including whether the event resulted in a win or loss.

In some embodiments described herein, the primary gaming portion 108 may display a grid(s) or equivalent arrangement(s) of playing cards 110 forming one or more hands or other sets of cards in a card game, such as a poker game. In the illustrated example, a set of five playing cards 110 forms a video poker hand, which represents a portion of a game play event. For example, if the game play event is a video draw poker game, the gaming device 100 may deal five cards, allow the user to select cards to hold, deal replacements for the cards not held, and determine a payout based on the final cards in the hand. The illustration and description of five-card draw poker is for purposes of example and not of limitation, as the disclosure is applicable to numerous other card games, such as stud poker or hold 'em poker, as well as other types of gaming activities and apparatuses, such as slot machines, dice, coins, etc. For example, some embodiments may relate to slot games, where the primary gaming portion 108 presents a grid (or equivalent arrangement) of symbols or other game elements in respective symbol locations (not shown), where the symbols or combinations of symbols determine gaming outcomes.

In some embodiments, the primary gaming portion 108 may also display one or more additional hands 112 of playing cards, such as in a multi-play poker embodiment. For example, one multi-play poker embodiment involves draw poker, where at least one hand 110 is dealt, and cards held by the player in hand 110 are replicated into one or more other hands 112, whereby all hands 110, 112 may then be completed with replacement cards while having one or more commonly held cards. Multi-play embodiments may also be played without holding any cards, and/or without replication of held cards into other hands. In some embodiments, other hands 112 may represent discrete, individually-played additional hands of cards that are unrelated to the play of other hands 110.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual cards to hold and/or selection of individual cards to discard and replace (e.g., in a draw poker embodiment), which subset of cards of a larger set of cards to hold/use for a final hand(s) (e.g., in some stud poker embodiments), wagering inputs, etc. The game display 106 of the display area 102 may include other features that are not shown, such as pay tables, navigation controls, etc.

Figure 2:
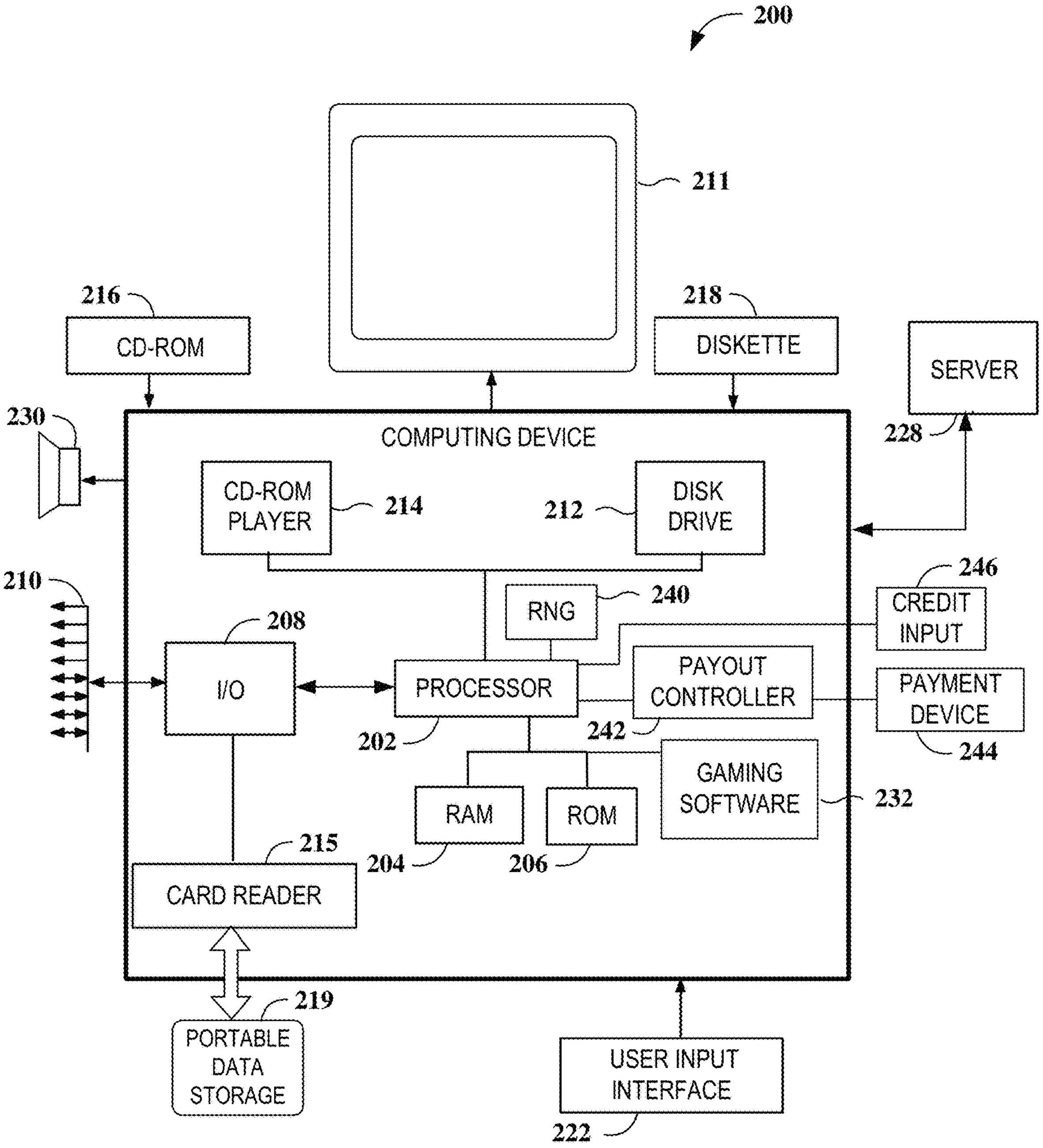
FIG. 2 is a block diagram illustrating a representative computing arrangement capable of implementing games and features in accordance with the invention and representative embodiments described herein.

Although FIG. 1 illustrates a particular implementation of some of the embodiments in a casino or electronic gaming machine ("EGM"), one or more devices may be programmed to play various embodiments of the disclosure. The concepts and embodiments described herein may be implemented, as shown in FIG. 1, as an electronic/video gaming machine or other special purpose gaming kiosk, or may be implemented via computing systems operating under the direction of local gaming software, and/or remotely-provided software such as provided by an application service provider (ASP). Such gaming machines may also utilize computing systems to control and manage the gaming activity, although these computing systems typically include specialized components and/or functionality to operate the particular elements of electronic gaming machines. Additionally, computing systems operating over networks, such as the Internet, may also include specialized components and/or functionality to operate elements particular to these systems, such as random number generators. An example of a representative computing system capable of carrying out operations in accordance with the principles described herein is illustrated in FIG. 2.

Hardware, firmware, software or any combination thereof may be used to perform the various gaming functions, display presentations and operations described herein. The functional modules used in connection with the disclosure may reside in a gaming machine as described, or may alternatively reside on a stand-alone or networked computer. The representative computing structure 200 of FIG. 2 is an example of a computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions described herein includes a processor(s), such as depicted by the representative central processing unit (CPU) 202, coupled to memory, such as random access memory (RAM) 204, and some variation of read-only memory (ROM) 206 or other persistent storage. The ROM 206 may also represent other types of storage media to store programs, such as programmable ROM (PROM), erasable PROM (EPROM or any technology capable of storing data). The processor 202 may communicate with other internal and external components through input/output (I/O) circuitry 208 and bussing 210, to communicate control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to one or more displays 211, which represent a manner in which the gaming activities may be presented. The display 211 represents the "presentation" of the game information in accordance with the disclosure, and may be a mechanical display, or an electronic/video display such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, inputting data to identify a player for a player loyalty system, etc. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices. Chance-based gaming systems such as slot machines, in which the present invention is applicable, are governed by random numbers and processors, as facilitated by a random number generator (RNG) or other random generator. The fixed and dynamic symbols generated as part of a gaming activity may be produced using one or more RNGs. RNGs may be implemented using hardware, software operable in connection with the processor 202, or some combination of hardware and software. The principles described herein are operable using any known RNG, and may be integrally programmed as part of the processor 202 operation, or alternatively may be a separate RNG controller 240 that may be associated with the computing arrangement 200 or otherwise accessible such as via a network. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server(s) 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 or other processor(s) indicating a payout is to made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout or payment device 244 may also be provided in gaming machine embodiments, where the payment device 244 serves as the mechanism providing the payout to the player or participant. In some embodiments, the payment device 244 may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency or asset. In yet other embodiments, the payout device 244 may send a signal via the network server 228 or other device to electronically provide a credit amount to an account associated with the player, such as a credit card account or player loyalty account. The computing arrangement 200 may also include accounting data stored in, for example, one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, or any other player assets, for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payment device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described herein. For example, the software 232 may present, by way of the display 211, representations of symbols to map or otherwise display as part of a slot based game having reels. However, in other embodiments, the principles of this concept may be applied to poker games or other types of games of chance. One or more aligned positions of these game elements may be evaluated to determine awards based on a pay table. The software 232 may include instructions to provide other functionality as known in the art or as described and shown herein.

Embodiments involve a gaming activity that comprises a card game, which may involve a single hand of cards or multiple hands of cards. The cards serve as the indicia that enables games to be conducted, through interaction of the card indicia. Cards in a current gaming activity may be marked or otherwise designated at card positions that will be enhanced, enriched, or otherwise exhibit a higher payout potential and/or likelihood of achieving a winning result.

These principles may be applied in a poker context, regardless of the type of poker game. The poker game may involve stud poker variations, draw poker variations, community card poker variations, any combination thereof, or any other wagering game utilizing cards. In one embodiment, one or more cards of a hand(s) in a single or multiple hand game may be randomly or systematically marked, and cards that are dealt to those marked positions in a subsequent hand(s) are benefitted or upgraded in some way, such as changing to a higher value, changing to a card more likely to result in a winning combination (e.g., wild card) and/or higher payout (e.g., multiplier or other payout modifier), etc.

In one embodiment, the precise positions of such cards is not provided, but rather a count of the number of cards (if any) that will be available for subsequent hand upgrades is provided in connection with a current poker game, and that number of cards (if any) will be upgraded or otherwise changed in a future poker game. For example, a random award of two poker card replacements may be awarded on a current poker hand, and on every fifth (for example) hand, two poker cards will be allowed to change to higher win and/or payout likelihood cards, and/or other enriched or higher value cards. The cards to be changed in such an embodiment may be fixed (e.g., change the number of cards from left to right in the future hand(s)), randomly selected, selected in response to other play conditions or occurrences (e.g., condition-based or rule-based card position selections), or the like.

Numerous variations are possible in view of these and other embodiments of the disclosure. Representative embodiments and variations are described herein, with some embodiments described with reference to the drawings. However, many other embodiments and variations exist that are covered by the principles and scope of this concept. For example, although some of the embodiments discussed below involve reel-based slot machine examples of this concept, other embodiments include application of these inventive techniques in other types of slot games, poker games, roulette, bingo, or other games of chance. Thus, many other types of games can implement similar techniques and fall within the scope of this disclosed concept.

Figure 3:
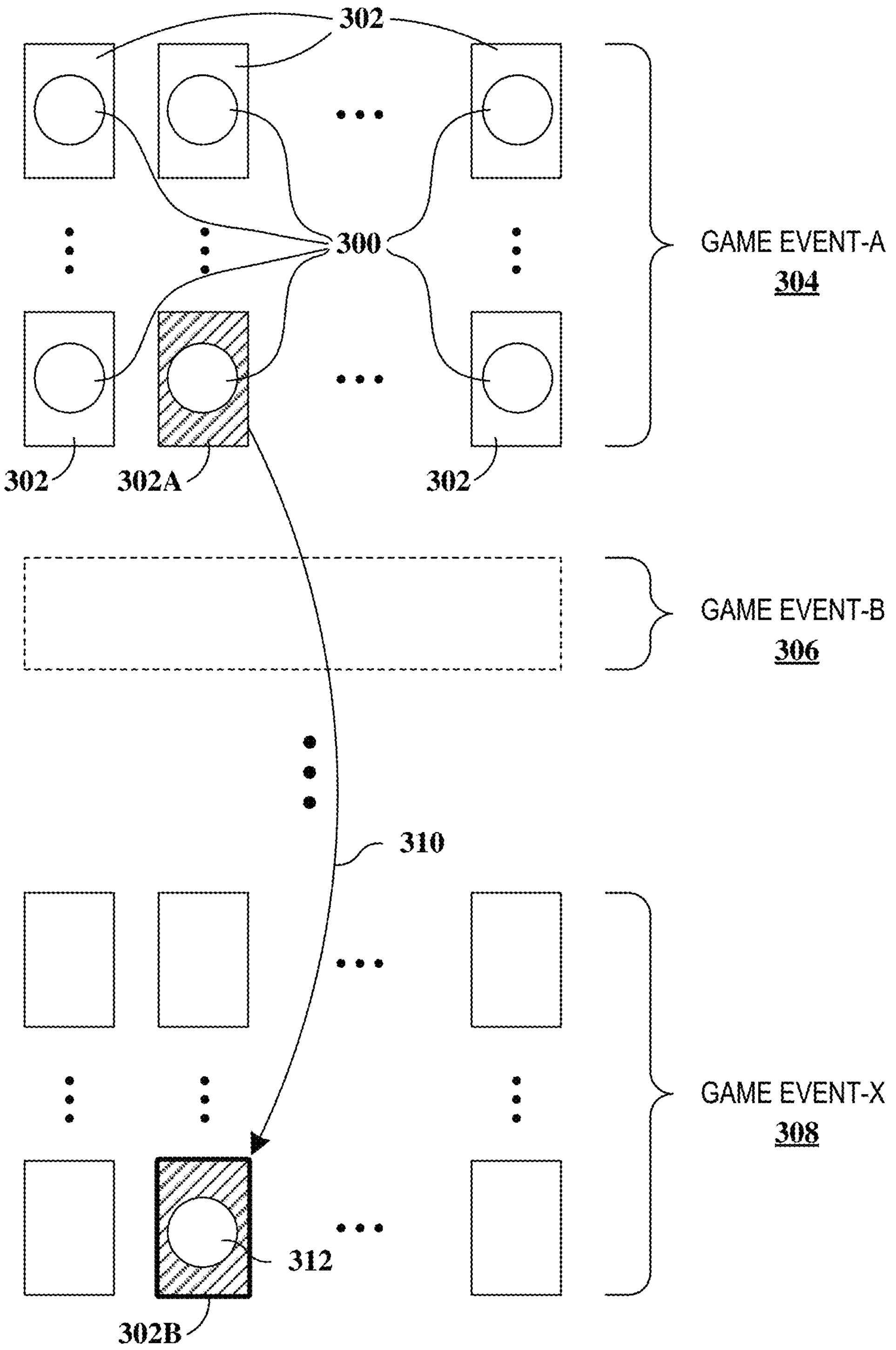
FIG. 3 illustrates a representative gaming activity having a plurality of consecutively-played gaming events that incorporates the forwarding of game play enhancements to future gaming events.

FIG. 3 illustrates a representative gaming activity having a plurality of consecutively-played gaming events that incorporates the forwarding of game play enhancements to future gaming events. A number of game play items 300 at game positions 302, 302A form a first game event-A 304. In connection with play of game play event-A 304, one or more of the game positions 302, 302A may be identified as a position in which future game play item enhancements may occur. In the illustrated embodiment, game position 302A has been randomly identified as a game position in which a game play item enhancement will be forthcoming in a future gaming event.

With one or more intervening gaming events, depicted by game event-B 306 and potentially more, the gaming activity reaches a gaming event where the game play item enhancement is offered. For example, in an embodiment where the game play item enhancement is offered every X gaming events, then game event-S 308 represents the Xth gaming event from the gaming event where the position 302A was marked. As seen by line 310, a corresponding position among the game positions 302A in game event-A 304 is identified as game position 302B at game event-X 308. The game play item 312 presented at game position 302B is enhanced in some way, such as being a Wild symbol in one embodiment. Thus, as a result of game position 302A being marked/identified in an earlier game event-A 304, an improved or otherwise favorable game play item 312 is awarded at the corresponding marked game position 302B for participation in game event-X 308.

As otherwise noted herein, some embodiments involve enabling the improved or otherwise favorable game play item to be presented in one or more subsequent gaming events. For example, the favorable game play item may be presented in a patterned fashion, such as every Nth gaming event (e.g., every third gaming event; every fifth gaming event; etc.), or in a designated pattern (e.g., in two gaming events, and then again in three gaming events, and then again in four gaming events, etc.). In other examples, the favorable game play item may be presented in a random fashion, such as randomly at the marked positions over the next X poker hands or other gaming events. These and other manners of forwarding the benefit to future gaming events may be utilized. The termination of such repeated enhancements may be based on desired criteria, such as after some number of uses of the enhancement (e.g., after future hands/gaming events have upgraded the marked position with enhanced symbols five times), after a time expiration (e.g., after 2 minutes), after a certain threshold of payout value resulting from the enhancement (e.g., when exceeding 200 credits), after a random time or event (e.g., could last for one future event, or for N future events), etc.

Figure 4:
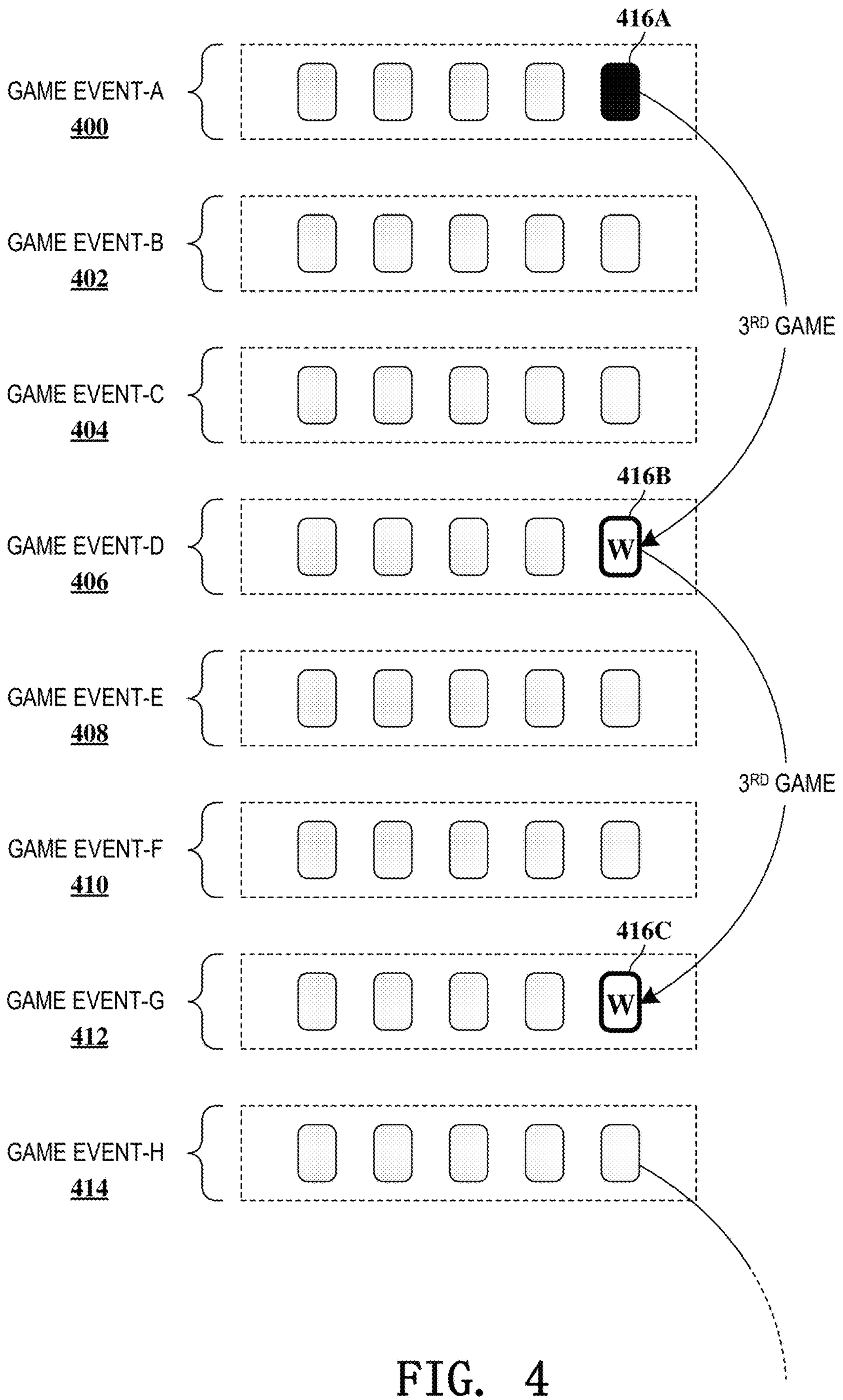
FIG. 4 depicts an example of enhancing game positions in future gaming events in a patterned fashion.

FIG. 4 depicts an example of enhancing game positions in future gaming events in a patterned fashion. In the illustrated embodiment of FIG. 4, a subset of a series of gaming events (e.g., poker hands) is depicted, including game events A 400, B 402, C 404, D 406, E 408, F 410, G 412, and H 414. This example assumes that the gaming event is poker, although the description applies to any game of chance. In a first game event-A, a card position 416A is marked, by card sub-symbol, card position highlighting, and/or other manner of identifying the card position 416A. In this example, it is assumed that an enhanced card will be provided at the corresponding card positions of card position 416A, every third poker hand played. Thus, at game event-D 406, corresponding card position 416B is provided with an enhanced card (a Wild card in this example), and again at game event-G 412 at corresponding card position 416C, etc.

Figure 5A:
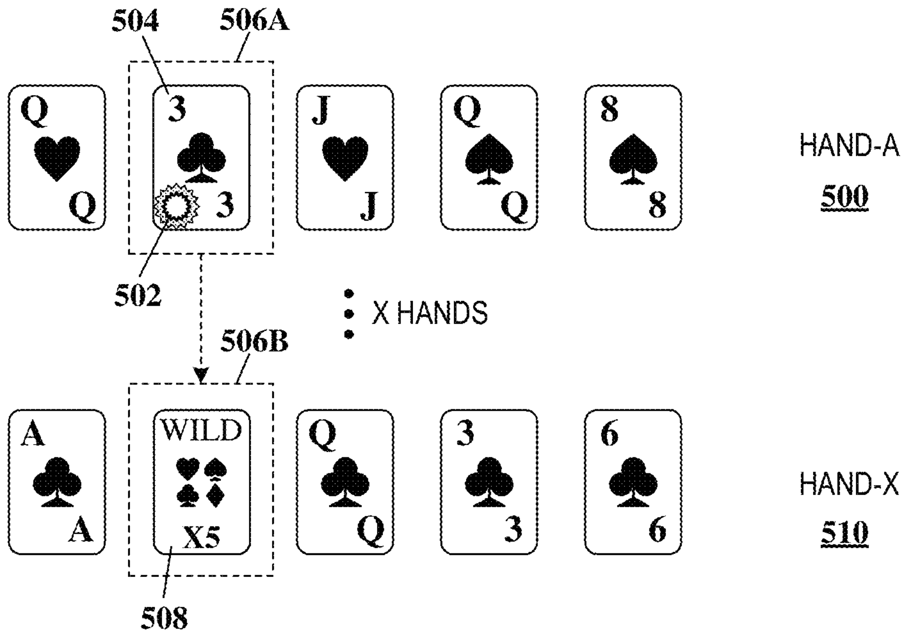
FIGS. 5A and 5B depict representative examples of single-hand stud poker games employing the card enhancement features described herein.
Figure 5B:
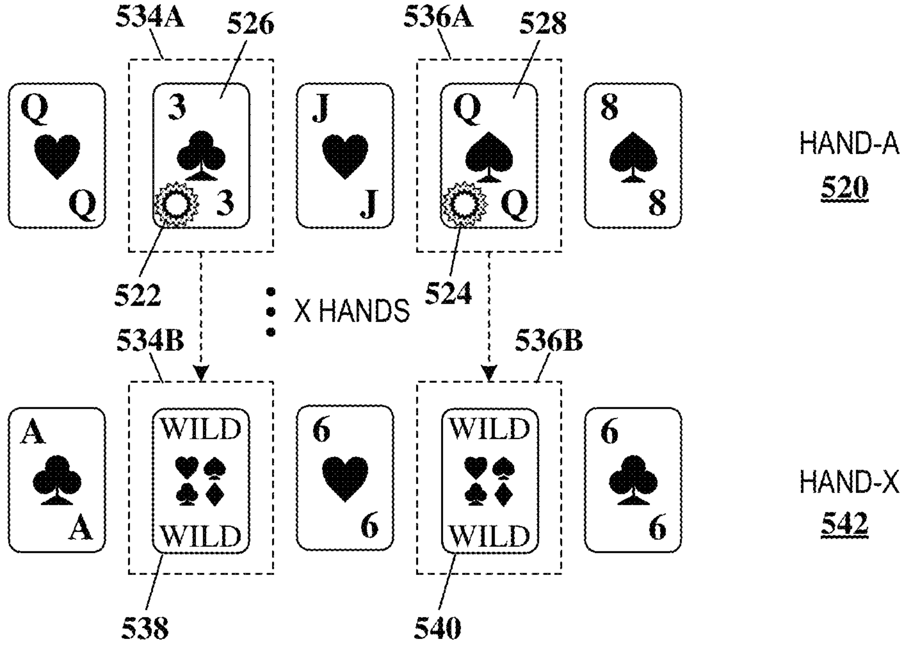

FIGS. 5A and 5B depict representative examples of single-hand stud poker games employing the card enhancement features described herein. In the example of FIG. 5A, a first hand-A 500 receives an indication, which is a sub-symbol 502 on a card 504 at card position 506 in this example. As a result of that sub-symbol 502 at card position 506, every X hands (e.g., every five hands) a Wild card 508 is provided at a corresponding card location 506B of hand-X 510 (e.g., the fifth subsequently played poker hand). In the illustrated embodiment, the Wild card 508 enabled the hand-X 510 to result in a flush of Clubs. In this example, the Wild card 508 is also a payout multiplier, i.e. a Wild×5, thereby providing a five times multiplier for the payout resulting from the flush of Clubs.

FIG. 5B depicts a first hand-A 520 of a single-hand stud poker game, where sub-symbols 522, 524 are presented in connection with multiple cards 526, 528 respectively. Thus, while no card locations could be marked, in other embodiments more than one card location 530, 532 may be marked at respective card positions 534A, 536A. After X hands, Wild cards 538, 540 are presented at corresponding card positions 534B, 536B of hand-X 542, resulting in four-of-a-kind (four sixes) in this example.

Figure 6:
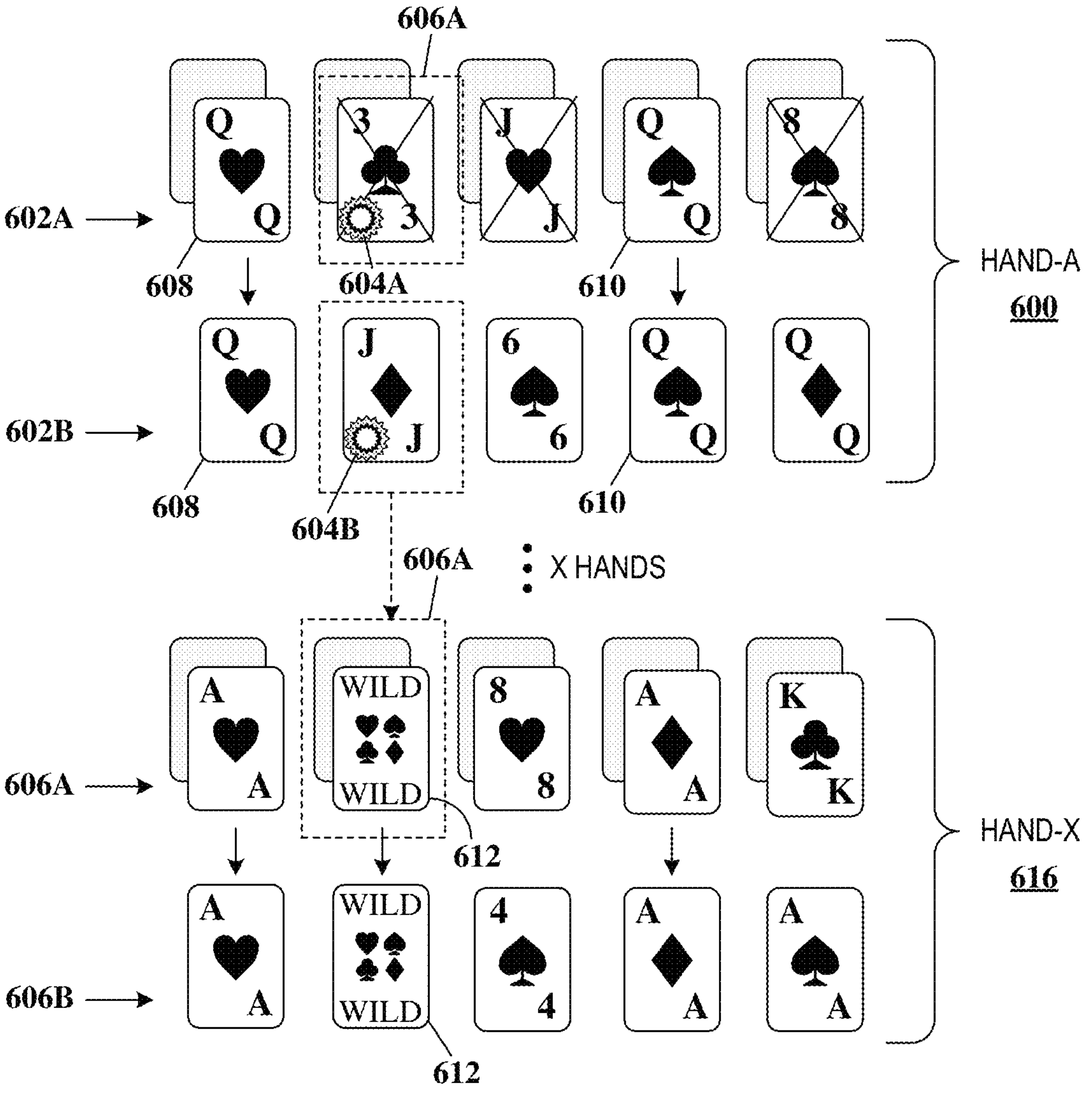
FIG. 6 depicts a representative example of a single-hand draw poker game employing the card enhancement features described herein.

FIG. 6 depicts a representative example of a single-hand draw poker game employing the card enhancement features described herein. A hand-A 600 is played, which includes an initial deal of a hand 602A, and after cards are drawn, a final hand 602B. In this example, a sub-symbol 604A (or other indicator) is provided to mark card position 606A of initial hand 602A. Cards may be held (e.g., cards 608, 610) and other cards are replaced to create the final hand 602B. Then, in X subsequent hands, an enhanced card such as a Wild card 612 is provided at corresponding card position 606A of the initial hand 614A of hand-X 616, which may be held into the final hand 606B.

As noted at hand-A 600, the sub-symbol 604A (and/or other card position indicator) may occur in the initial hand 602A. Alternatively, the sub-symbol 604B may occur in connection with the final hand 602B in connection with a drawn card, or may even occur in connection with a held card 608 in the final hand 602B.

Figure 7:
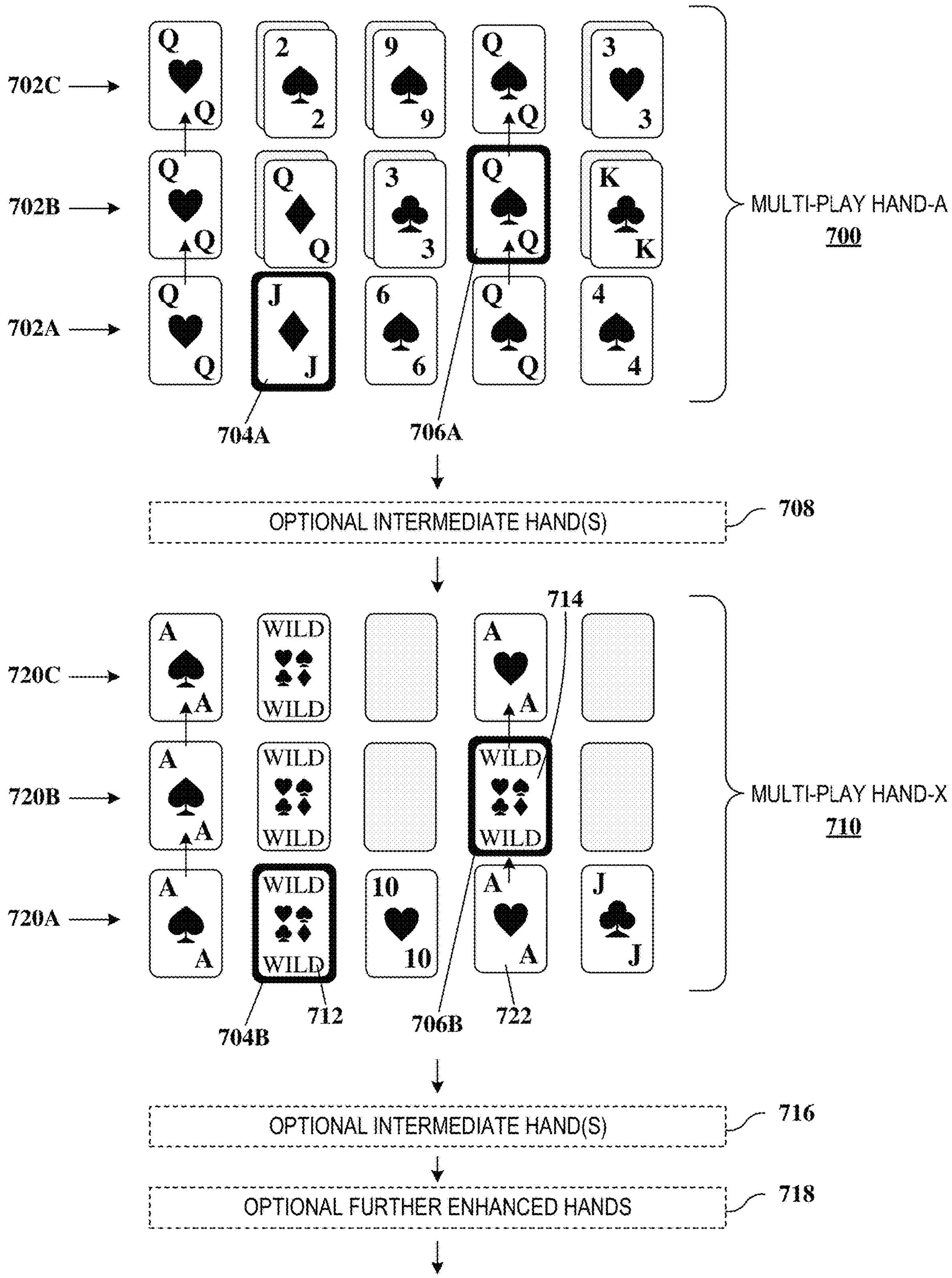
FIG. 7 depicts a representative example of a multi-hand draw poker game employing the card enhancement features described herein.

FIG. 7 depicts a representative example of a multi-hand draw poker game employing the card enhancement features described herein. A multi-play hand-A 700 is played, which includes an initial deal of a hand 702A, and two more (in this example) hands 702B, 702C. In one embodiment, cards held in the initial hand 702A are replicated into corresponding card positions of other hands 702B, 702C (although the cards could be replicated into any of the card positions of the other hands 702B, 702C). After cards are drawn, into the non-held card positions, final hands result for each of the hands 702A, 702B, 702C.

In this example, card positions 704A, 706A are randomly identified, such as with card position highlights, outlines, colors, and/or other identifiers, thereby identifying those card positions 704A, 706A for future card enhancement. Thus, after one or more optional intermediate played hands 708 (e.g., after four intermediate hands 708 where the card enhancement will occur every fifth hand), another multi-play hand-X 710 is presented where the highlighted card positions will receive the benefit of an upgraded card. More particularly, a Wild card 712, 714 is provided at each of the identified card positions 704B, 706B as a result of the card positions 704A, 704B having been marked for future card enhancement. The card enhancement feature may continue, whereby after one or more additional optional intermediate hands 716, additional card enhancements may be used in further optional enhanced hands 718.

In one embodiment, the identified card position 704B may be associated with the initially dealt hand 720A, where in other embodiments the identified card position 706B may be associated with one or more of the other hands 720B, 720C. Where the enhanced card 714 is in a hand where a card 722 from hand 720A has been held and replicated into the other hands 720B, 720C, various embodiments may treat the replication and enhanced card differently. For example, the replicated card 722 may override the enhanced card 714. In another embodiment, the enhanced card 714 may override the replicated card 722, as depicted in the example of multi-play hand-X 710 of FIG. 7. In still other embodiments, the "better" of the replicated card 722 and the enhanced card 714 may be used. In other embodiments, the enhanced card 714 is guaranteed to be as least as favorable as the replicated card 722, whereby the enhanced card 714 is always used (e.g., if a Wild card, it also includes any card that could be replicated, and therefore the enhanced Wild card will be used). These and other rules may be applied for card positions involving both a potentially replicated card and an enhanced card.

Figure 8:
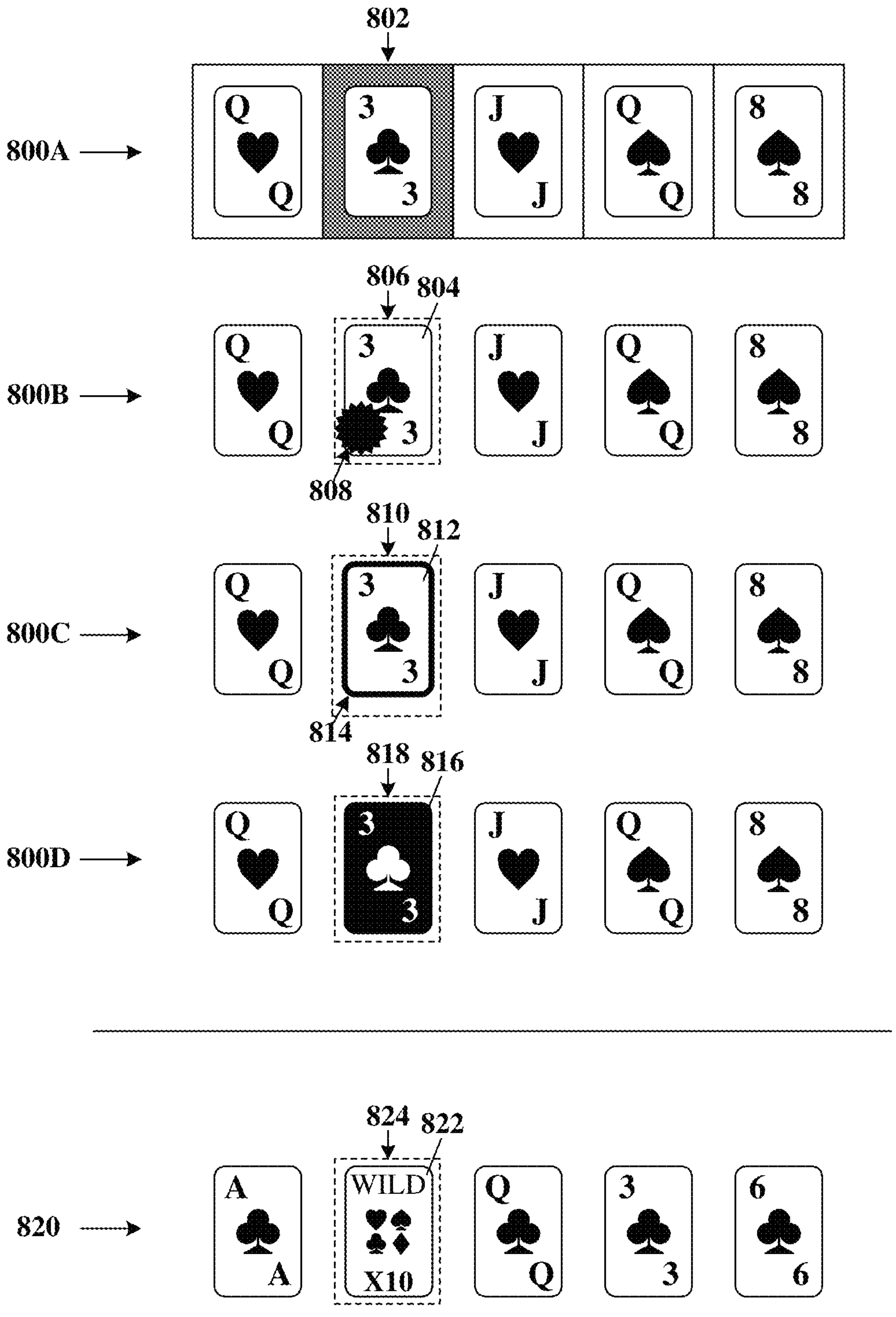
FIG. 8 depicts representative manners of identifying game play item positions for subsequent game play item enhancement.

FIG. 8 depicts representative manners of identifying card positions (or other game play item positions) for subsequent card/game play item enhancement. Those identified in FIG. 8 are depicted as examples only, as any manner of identifying such positions may be employed. Representative hand 800A depicts that the card position 802 itself may be highlighted, such as a color, background, highlight, shape, etc. Representative hand 800B depicts that the card 804 may provide the indication at the card position 806, such as via a sub-symbol 808 or other signifier. Representative hand 800C depicts that the card position 810 for a card 812 may exhibit the indication, such as a colored or otherwise highlighted border 814, shape, visual flashing, audio indicator (e.g., "the card position associated with the 3 of Clubs is marked for future enhancement"), etc. Representative hand 800D depicts that the card 816 may provide the indication at the card position 818, such as a change to the card characteristics, such as a color change, font change, negative effect as depicted in FIG. 8, larger sized card, etc. In any of these or other card position identifiers, the subsequent hand 820 may be modified to provide an enhanced card 822 at the corresponding card position 824.

The present disclosure sets forth apparatuses and methodologies where, among other things, card positions are marked in connection with play of one poker game, and those marked card positions are rewarded with an enriched or otherwise enhanced card in some number of later-played games. In one embodiment, the later played games may be the immediately succeeding poker game, and in embodiments where the enhanced card is provided in a repeated manner, in consecutive subsequent hands. This may continue indefinitely, or may end, such as when a termination condition is met.

In other embodiments, the later played games are separated from the poker game in which the reward originated (e.g. the poker hand in which a random designation of one or more of the card positions occurred) by at least one intermediate poker hand. For example, the random designation of at least one card position may occur on hand #1, and the subsequent hand that gets to use enhanced card(s) at a corresponding card position(s) on hand #3, or hand #4, etc. In such embodiments, card positions get marked in connection with some poker event (e.g. poker hand, or multi-hand poker game), and then provides a reward every X games until a termination event occurs. Such "gaps" of intermediate poker games/hands may be fixed such that the use by subsequent hands is periodic (e.g. every $5^{th}$ poker game played). Alternatively, such gaps of intermediate poker games/hands may be random such that the use by subsequent hands is not necessarily periodic (e.g. on the $3^{rd}$ next poker hand, and then on the $5^{th}$ next poker hand, and then on the $8^{th}$ next poker hand, etc.). In still other embodiments, the gaps may be non-periodic, but predictable, such as in a pattern (e.g., the immediately subsequent poker game; next the $3^{rd}$ subsequent poker game; next the $5^{th}$ poker game; next the $7^{th}$ poker game; etc.).

The enhanced cards, whether provided during the same poker game or different poker games, may be the same enhanced card in some embodiments (e.g. all enhanced cards are wild cards), or may be different enhanced cards in other embodiments (e.g. some enhanced cards are wild cards, some may be wild cards with a multiplier or other modifier, some may be high-value cards, etc.).

Figure 9A:
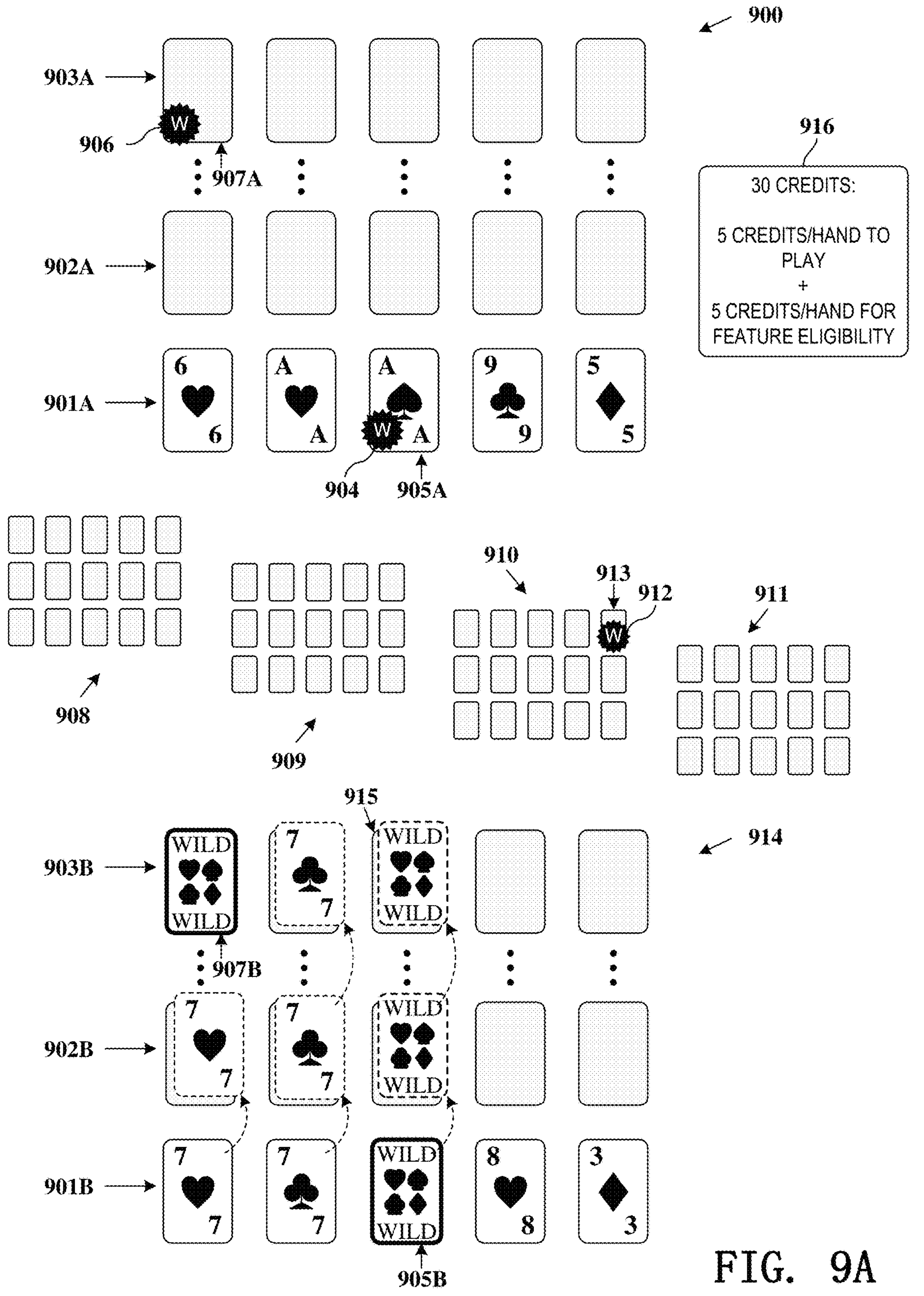
FIGS. 9A-9C depict representative examples of providing future card enhancements or other such awards in multi-play poker games based on triggering events occurring in earlier multi-play poker games.
Figure 9B:
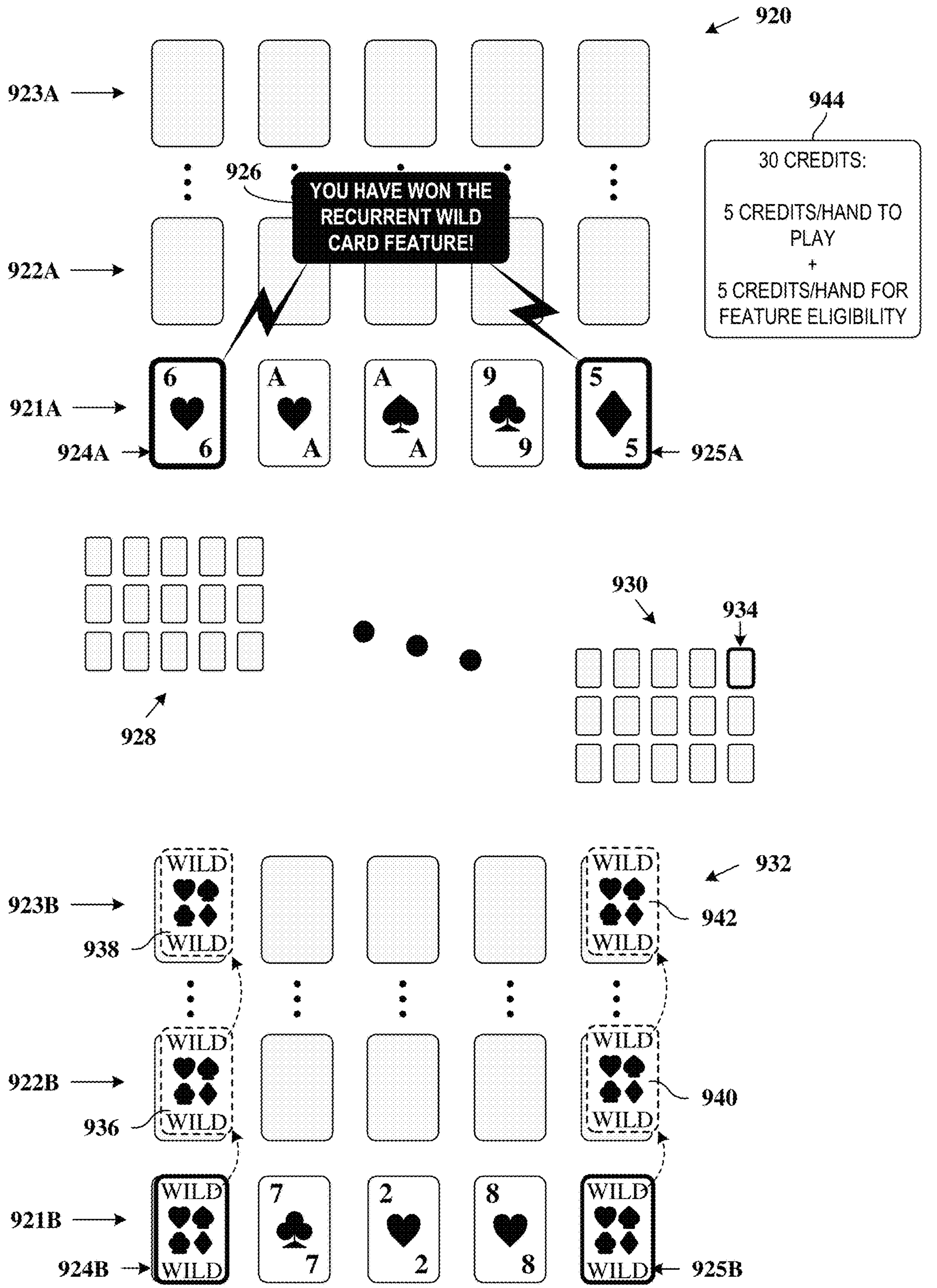
Figure 9C:
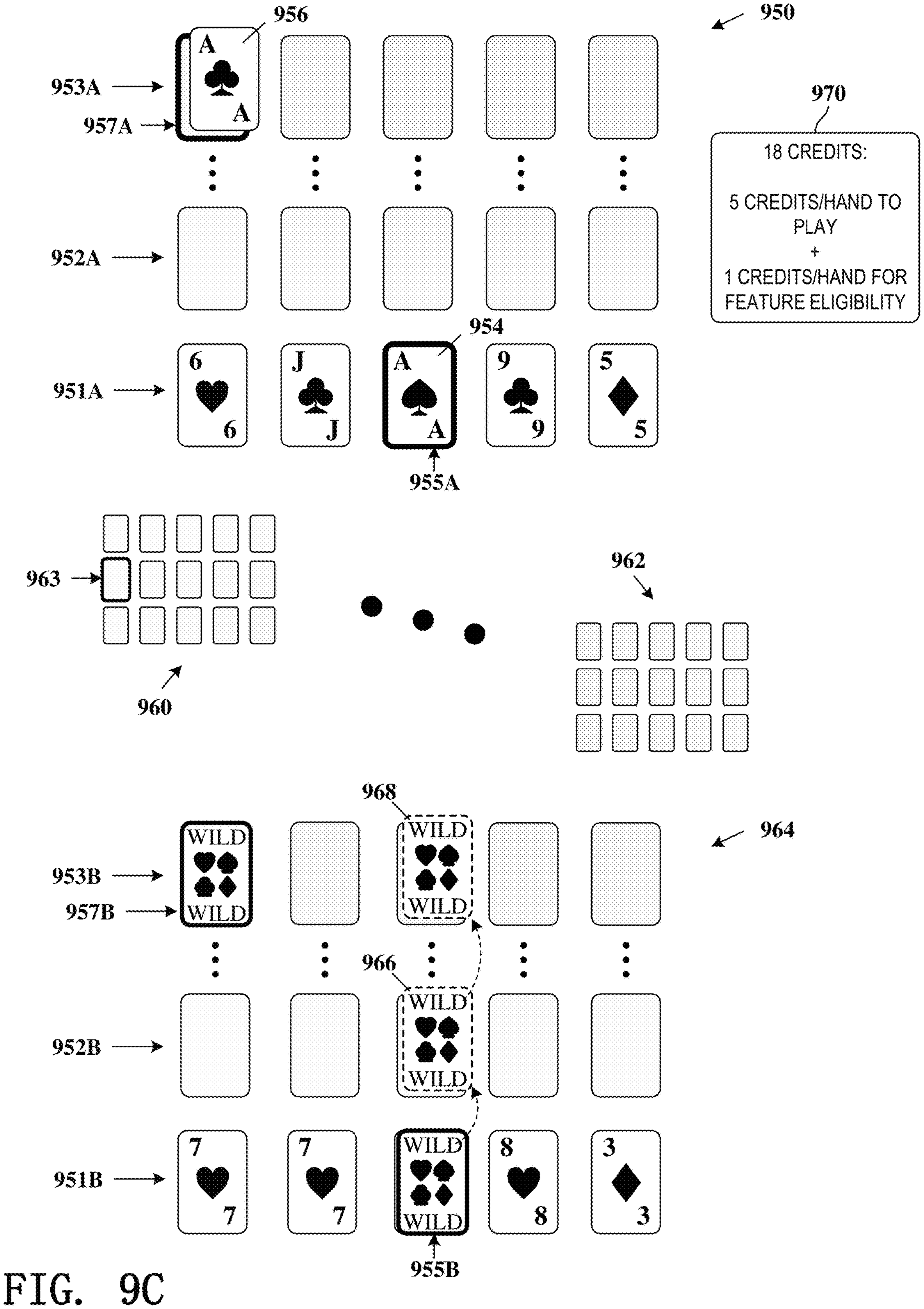

Additionally, the principles set forth herein are applicable in single-hand poker games, multi-hand poker games, multi-play poker games (e.g. multi-hand poker games with particular rules, such as replicating cards held in one hand into the other concurrently-played hands), and the like. FIGS. 9A-9C depict representative examples of providing future card enhancements or other awards in multi-play poker games based on triggering events occurring in earlier multi-play poker games.

Referring first to FIG. 9A, a multi-hand poker game 900 is shown, having a first poker hand 901A, at least one additional concurrently played hand 902A, and up to any desired number of additional hands. In the illustrated embodiment, another concurrently played hand 903A is also provided, such that three hands 901A, 902A, 903A will be concurrently played. For purposes of the examples of FIGS. 9A, 9B and 9C, the multi-hand games will be considered played in a multi-play manner, where cards held in a first hand (e.g. hand 901A) will be replicated into the other hands (e.g. 902A and 903A), and cards that are not held or replicated will be discarded and replaced in a draw poker manner. Thus, in the example of FIG. 9A, the multi-play embodiment is a "triple-play" embodiment, as three hands are concurrently played in this manner.

In this example, any of the cards of any of the hands 901A, 902A and/or 903A may or may not receive some indication that the associated card position will be rewarded with an enhanced card in a subsequent hand. Where such indication is provided, some embodiments involve repeatedly providing the enhanced card(s) in multiple subsequent hands. While the manner of providing such indication may be done in any manner, the embodiment of FIG. 9A employs sub-symbols proximate cards and/or their associated card positions to identify the respective card position(s) as eligible for the future benefit. For some poker games, no such indication may arise to provide the subsequent hand benefits. In other embodiments, one or more such indications may arise to provide the subsequent hand benefits. In the illustrated embodiment, two such indications arose, including sub-symbol 904 associated with card position 905A of hand 901A, and sub-symbol 906 associated with card position 907A of hand 903A.

In one embodiment, the benefit is not provided for the current poker game 900, but a number of equally-spaced or randomly-spaced subsequent poker games. In the illustrated embodiment, it is assumed that the benefit-receiving card positions, arising from occurrence of the sub-symbols 904, 906 of poker game 900, will be available for use every five poker hands. Thus, the occurrence of sub-symbols 904, 906 in poker game 900 will not be used for intermediate hands 908, 909, 910, 911, but rather on the fifth subsequently-played poker game 914. The enhanced cards, Wild cards in this example, are provided at card positions 905B and 907B of poker game 914, which correspond to card positions 905A and 907A of poker game 900. As this example is a multi-play poker game, cards held in the first hand 901B of poker game 914 are replicated into corresponding card positions of the other hands 902B, 903B, as seen by the replication of the held 7 of Hearts, 7 of Clubs, and Wild card from hand 901B into hands 902B and 903B.

If a card position, such as card position 907B, is designated to receive an enhanced card (e.g. Wild card), and would otherwise receive a replicated held card (e.g. 7 of Hearts) as card position 907B is, one embodiment involves taking the best of the replicated card and the enhanced card. In another embodiment, the enhanced card will occupy card position 907B. In another embodiment, the held card will occupy card position 907B. In still another embodiment, the player can choose which of the enhanced card or the replicated card will occupy such card position 907B. Still other embodiments may impose different rules in cases of card positions subject to both the enhanced card and a replicated held card, and those provided herein are representative and do not represent an exhaustive list.

In any event, in the example of FIG. 9A, the poker game 914 is able to utilize the enhanced cards at card positions

905B and 907B to potentially improve the result of any one or more of the hands 901B, 902B, 903B and/or any payouts arising therefrom. The remaining dealt cards or yet-to-be-dealt cards that are not enhanced cards, held cards, or replicated held cards, can be provided (e.g. replaced or first dealt) as drawn cards in a draw poker game. For example, with the use of enhanced Wild cards at card positions 905B and 907B and the held and replicated cards, hands 901B, 902B, and 903B will result in at least Three-of-a-Kind in Sevens, and may obtain greater results including a Full House or Four-of-a-Kind. Hand 903B is additionally capable of resulting in a Flush, or Straight Flush, as both the directly provided enhanced Wild card at card position 907B and the replicated enhanced Wild card at card position 915 provide a greater range of possible results than where only one Wild card is present.

In FIG. 9A, the usability of the enhanced cards on the fifth subsequent hand 914 represents one poker game use of potentially multiple available poker game uses, such as by allowing repeated use of the enhanced cards every fifth poker game played (versus just the first time the fifth poker game arises). Thus, in one embodiment, still further subsequent hands may be played, with card positions corresponding to card positions 905B and 907B being used on every fifth subsequent poker game. In other embodiments, the intermediate number of poker games between those poker games where the enhanced card is available for use may not be fixed, such as being a randomly-determined number, a patterned number (e.g. increasing even numbers), or the like.

In one embodiment, the repeated ability for poker hands to use the enhanced cards, with the use of intermediate poker hands that do not use the enhanced cards, may continue until a termination event occurs, such as a termination condition(s) being met. Such a termination event/condition may be a fixed number of times the enhanced card is provided for use, or a fixed number of poker hands played, or a random number of times the enhanced card is provided for use, or a random number of hands played, or a random occurrence of a termination indication, or the occurrence of a particular poker hand and/or poker hand result, or a particular payout, or receipt of a minimum collective payout from using the enhanced card, or reaching a maximum collective payout from using the enhanced card, or reaching a threshold of a minimum or maximum amount during the time the periodic enhanced card has been active, or based on the input wager, or the like. Any desired termination condition may be used, and those mentioned herein are examples and do not represent an exhaustive list.

In some embodiments, the enhanced cards (Wild cards in this example) are also used in connection with the poker game 900 from which they originated, thereby allowing cards at card positions 903A and 905A of poker game 900 to be Wild cards (whether originally dealt to those card positions, changing already-dealt cards to those card positions, etc.).

It should be recognized that the sub-symbols or other indications of future poker game enhanced card awards may be provided on any of the poker games, including the intermediate poker games (e.g. poker games 908, 909, 910, 911) and the benefit-receiving poker game 914. For example, intermediate poker hand 910 is depicted as also receiving an indication 912 associated with card position 913. In accordance with the present example in which the enhanced card is received every fifth poker game played, then an enhanced card resulting from the triggering indicator 912 at card position 913 of poker game 910 will be available for use after poker games 911, 914, two more intermediate poker games (not shown), and then made available on the next benefit-receiving poker game (not shown) at the card position corresponding to card position 913 of poker game 910 (or, in other embodiments, any position of the hand in which the card position 913 was indicated 912).

Any desired wagering structure may be used, whether incorporated into a single wager to play the poker game, whether being eligible for the subsequent hand enhanced card feature involves an extra payment of some kind, etc. The embodiment of FIG. 9A assumes a 5+5 structure for a total of thirty credits for a 3-hand poker game, involving five credits to play each of the three hands 901A, 902A, 903A in poker game 900 and hands 901B, 902B, 903B in poker game 914, plus five additional credits to be eligible for the card enhancement feature for each of the three hands, as depicted at the notice display 916. However, the betting structure may be managed in any way desired, such as 5+1, 5+2, 5+3, 5+4, 5+5, 5+45, etc.

Some embodiments may also be employed to determine whether an indication to provide a subsequent hand benefit will be active (thereby enabling the subsequent hand benefit) or passive (thereby not enabling the subsequent hand benefit). For example, the player may place additional wagers to activate card positions or card columns or hands, etc. If the indicators are randomly or otherwise provided in an activated card position or column, the indicator will be active, thereby enabling the subsequent hand benefit. In such a case, there might be no additional general wager to be eligible for the subsequent hand benefit, but rather the additional wager (s) is to make eligible certain portions (subset or the entire set) of card positions in which received indicators activate the subsequent hand benefit features.

FIG. 9B depicts another example, involving a multi-hand poker game 920 including three poker hands 921A, 922A, and 923A. Any of the cards of any of the hands 921A, 922A and/or 923A may or may not receive a triggering indication that the associated card position will be rewarded with an enhanced card in a subsequent hand. As previously noted, some embodiments involve providing the benefit a single time some number of hands in the future, while other embodiments involve repeatedly providing the enhanced card(s) in multiple subsequent hands. The example of FIG. 9B depicts another representative manner of identifying card positions for future hand benefit, namely highlighting the card and/or card position to visually distinguish it from the other card positions. For example, a mystery trigger may occur, which may be a random occurrence of one or more highlighted card position indications. FIG. 9B depicts an example where two card positions 924A, 925A are randomly triggered for this feature, where the indication may be, for example, a colored halo at the respective card positions 924A, 925A. In one embodiment, the player is notified that the subsequent hand benefit has been awarded by way of a visual indication 926 and/or other perceivable notice.

In the example of FIG. 9B, it is assumed that the benefit is repeatedly provided every seven (7) poker games. Thus, six intermediate poker games from a first intermediate poker game 928 through a last intermediate poker game 930 may pass without use of enhanced cards at card positions corresponding to card positions 924A, 925A of poker game 920, but the seventh poker game 932 is allowed to receive the enhanced cards.

As previously described, any other poker game being played by the player, such as intermediate poker game 930, may also receive the mystery trigger (e.g. card position 934) to initiate a new 7-game repeated card enhancement, thereby resulting in overlapping future benefits running in parallel.

For the example of FIG. 9B, the seventh poker game 932, relative to the poker game 920 in which the mystery triggers occurred, receives enhanced cards. As previously noted, the enhanced cards may be the same, may be selected from a pool of available enhanced cards, may be dynamically determined based on a state of other cards dealt to one or more of the hands 921B, 922B, 923B, etc.

The enhanced cards, Wild cards in this example, are provided at card positions 924B and 925B of poker game 932, which correspond to card positions 924A and 925A of poker game 920 where the benefit originated and the count to the eligible subsequent hand begins. As this example is a multi-play poker game, cards held in the first hand 921B of poker game 932 are replicated into corresponding card positions of the other hands 922B, 923B, as seen by the replication of the held Wild cards 936 and 938 from card position 924B, and Wild cards 940 and 942 from card position 925B. Each of the hands 921B, 922B, 923B of poker game 932 therefore obtains the benefit of the enhanced cards, as the Wild cards provided to card positions 924B, 925B were able to be replicated into the other hands. Other cards that were not enhanced cards, or held cards, or replicated cards, may be obtained via a "draw" of cards to provide resulting hands that may be analyzed for winning results and/or payouts.

In one embodiment, in addition to poker game 932 being able to use the enhanced cards provided at card positions 924B and 925B, this embodiment assumes that the benefit is repeated every seventh poker game played. Therefore, still future poker games (not shown) will receive the benefit in a manner analogous to that described in connection with poker game 932. This may continue indefinitely, or may end after a fixed, or dynamic, or situation-dependent, or random, or other defined termination event occurs.

Any desired wagering structure may again be used, and for the embodiment of FIG. 9B, a 5+5 structure for a total of thirty credits for a 3-hand poker game is again assumed (e.g. five credits to play each of the three hands 921A, 922A, 923A in poker game 920 and hands 921B, 922B, 923B in poker game 932, plus five additional credits to be eligible for the card enhancement feature for each FIG. 9C illustrates yet another representative example, involving a multi-hand poker game 950 including three poker hands 951A, 952A, and 953A. This embodiment assumes that receiving an Ace will trigger its respective card location, where it may be every time an Ace is received, or randomly for Aces that are received. For example, in one embodiment, receiving an Ace in any of the hands 951A 952A, 953A may or may not provide the subsequent hand benefit indication, where in other embodiments the subsequent hand benefit indication is provided for each card position in which an Ace appears.

An Ace (Ace of Spades) 954 has been dealt to card position 955A of poker game 950, which in this embodiment triggers the subsequent hand benefit. While any indication may be utilized, a green halo or other colored aura distinguishes card position 955A from other card positions. In this embodiment, it is also assumed that another Ace (Ace of Clubs) has been provided, but assumed to have been provided as a replacement or "draw" card. Therefore, subsequent hand benefit indications may, in some embodiments, be provided at any stage of play of the poker game 950. The player may then play out the hands 951A, 952A, 953A of poker game 950 to completion.

In the example of FIG. 9C, it is assumed that the benefit is repeatedly provided every seven (7) poker games. Thus, six intermediate poker games from a first intermediate poker game 960 through a last intermediate poker game 962 may pass without use of enhanced cards at card positions corresponding to card positions 955A, 957A of poker game 950, but the seventh poker game 964 is allowed to receive the enhanced cards.

As previously described, any other poker game being played by the player, such as intermediate poker game 960, may also receive the indication (e.g. card position 963) to initiate a new 7-game repeated card enhancement, thereby resulting in overlapping future benefits running in parallel.

For the example of FIG. 9C, the seventh poker game 964, relative to the poker game 950 in which the mystery triggers occurred, receives enhanced cards. The enhanced cards may be the same, may be selected from a pool of available enhanced cards, may be dynamically determined based on a state of other cards dealt to one or more of the hands 951B, 952B, 953B, etc. The enhanced cards, Wild cards in this example, are provided at card positions 955B and 957B of poker game 964, which correspond to card positions 955A and 957A of poker game 950 where the benefit originated and the count to the eligible subsequent hand begins. As this example is a multi-play poker game, cards held in the first hand 951B of poker game 964 are replicated into corresponding card positions of the other hands 952B, 953B, as seen by the replication of the held Wild cards 966 and 968 from card position 955B.

Each of the hands 951B, 952B, 953B of poker game 964 therefore obtains the benefit of the enhanced cards, as the Wild card provided to card position 955B is able to be replicated into the other hands 952B, 953B. Additionally, card position 957B also receives an enhanced card (Wild card in this example). Other cards that were not enhanced cards, or held cards, or replicated cards, may be obtained via a "draw" of cards to provide resulting hands that may be analyzed for winning results and/or payouts.

The subsequent hand benefit may repeat every seventh subsequently-played hand, or in other embodiments may only occur once. For embodiments that repeat, the repeated subsequent hand benefit may end upon occurrence of a defined termination event. In some embodiments, the repeated subsequent hand benefit may also be terminated when a new player begins playing the game, such as when a current player cashes out. In such an embodiment, only the player who wagered for the poker game in which the benefit arose will receive the benefit. In other embodiments, the subsequent hand benefit may not terminate when a player cashes out, and may be transferred to future players.

Any desired wagering structure may again be used, and for the embodiment of FIG. 9C, a 5+1 structure for a total of eighteen credits for a 3-hand poker game is again assumed (e.g. five credits to play each of the three hands 951A, 952A, 953A in poker game 950 and hands 951B, 952B, 953B in poker game 964, plus one additional credit to be eligible for the card enhancement feature for each of the three hands), as depicted at the notice display 970.

For the embodiments of FIGS. 9A-9C, every card in the plurality of poker hands has a chance to receive the triggering indication(s) that provides the subsequent hand benefit. Other embodiments may limit providing the indications to particular card locations, particular hands, only on particular poker games (e.g. eligible every other game), etc. Occurrence of the triggering condition may be dependent on which cards are dealt, initial hand ranks, completely independent of the cards dealt, etc.

Figure 10A:
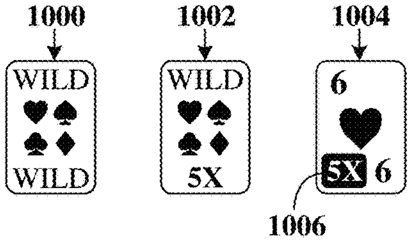
FIGS. 10A-10C depict examples of representative types of enhanced cards that may be provided on eligible subsequent hand card positions.
Figure 10B:
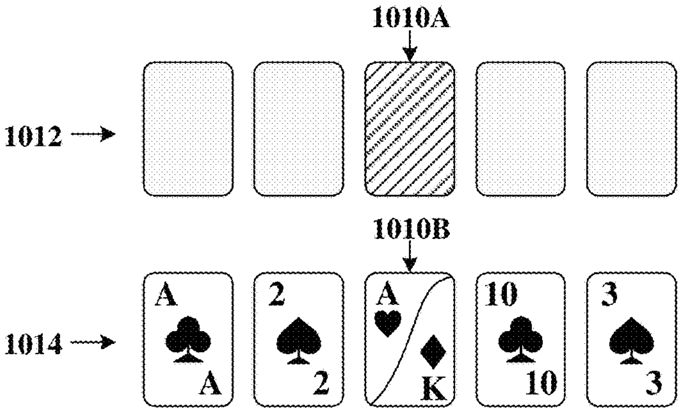
Figure 10C:
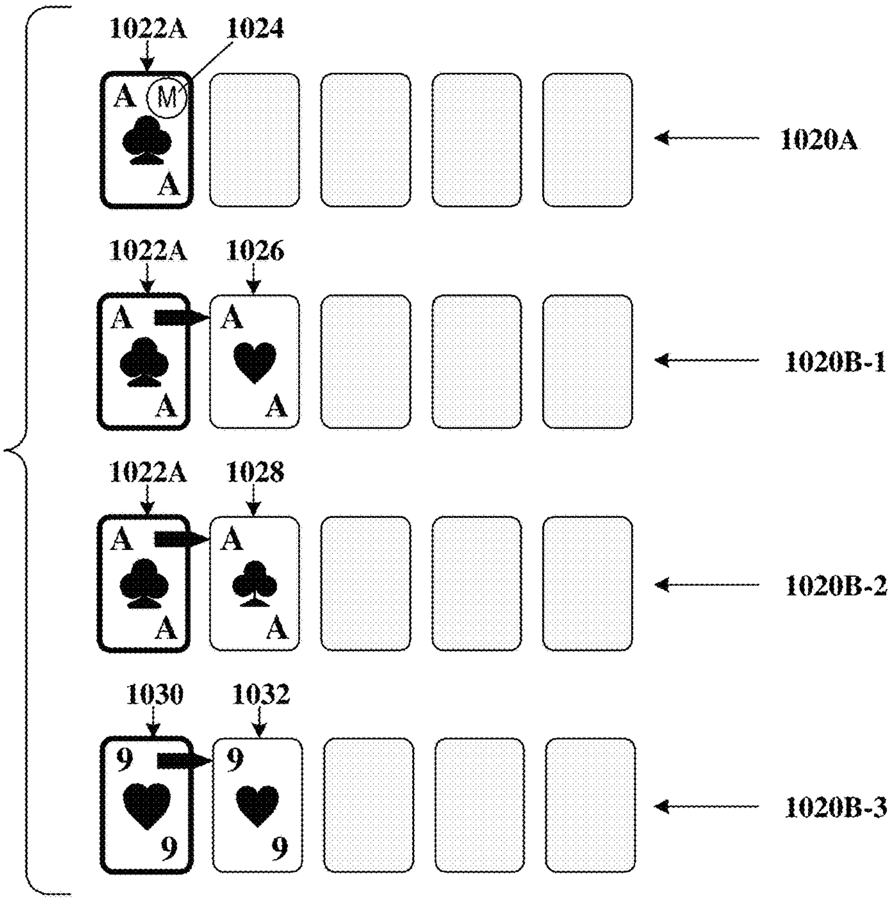

FIGS. 10A-10C depict examples of representative types of enhanced cards that may be provided on eligible subsequent hand card positions. Those examples in FIGS. 10A-

10C are merely representative examples, and other manners of enhancing cards or hands may alternatively or additionally be employed.

FIG. 10A depicts some examples described previously herein, including Wild cards 1000, Wild cards with a multiplier 1002 or other modifier, and cards 1004 providing a multiplier 1006 or other modifier. Some embodiments have a single enhancement card (e.g. Wild cards 1000), where other embodiments may allow the use of two or more enhancement cards such as randomly selecting between a Wild card 1000, Wild card with multiplier 1002, and a multiplier 1006. In the case of multipliers (e.g. cards 1002, 1004), an awarded multiplier in a subsequent hand may be applied to the hand in which the card 1002, 1004 is provided, or in other embodiments may be applied to all hands of the poker game, etc.

FIG. 10B depicts another example of a card enhancement that may be provided on an eligible subsequent hand. This embodiment represents a Split Card embodiment, where multiple cards may occupy a card position, which is also described U.S. Pat. No. 8,323,085, entitled "Method And Apparatus For Increasing Potential Payout Opportunities In Card Games," issued Dec. 4, 2012, the content of which is hereby incorporated by reference in its entirety. For example, an indicator may mark card position 1010A in a first poker game/hand 1012, where the enhanced card provided to that card position 1010B in the subsequent hand 1014 is a Split Card. In this example, the Split Card represents both an Ace of Hearts and a King of Diamonds, thereby providing the player with the benefit of having either or both of those cards at the player's disposal to enhance a result and/or payout for hand 1014.

FIG. 10C depicts another example of a card enhancement that may be provided on an eligible subsequent hand. This embodiment represents a Mirror Card embodiment, where a card may be replicated within a hand or to another hand. For example, an enhanced card may be provided to card position 1022A of poker hand 1020A, which is designated as a Mirror Cards (e.g., a particular card, or provided with some indicia 1024 indicating such, etc.). One available result for such a Mirror Card is shown at hand 1020B-1, which represents a next stage upon receiving such a Mirror Card at card position 1022A. Particularly, hand 1020B-1 shows Mirror card 1022A being replicated or "mirrored" into another card at an adjacent card position 1026. In one embodiment depicted at hand 1020B-1, the card that receives the benefit of the mirror card is a card of the same rank but not card suit (e.g. An Ace is mirrored to any other suited Ace). In another example, hand 1020B-2 shows Mirror card 1022A being replicated into another card at an adjacent card position 1028. In this embodiment, the card that receives the benefit of the mirror card is a card of the same rank and suit (e.g. an Ace of Clubs is mirrored to an Ace of Clubs). In another example, hand 1020B-3 shows Mirror card 1030 being replicated into another card at an adjacent card position 1032. In this embodiment, the mirror card may change from the card at the triggering card position 1022A of hand 1020A, such as changing to a 9 of Hearts at card position 1030, while enabling that card to be mirrored into an adjacent card position 1032. Again, the examples of FIGS. 10A-10C are provided to show representative enhanced cards, although any other enhanced cards or enhancement techniques may alternatively or additionally be employed.

Figure 11A:
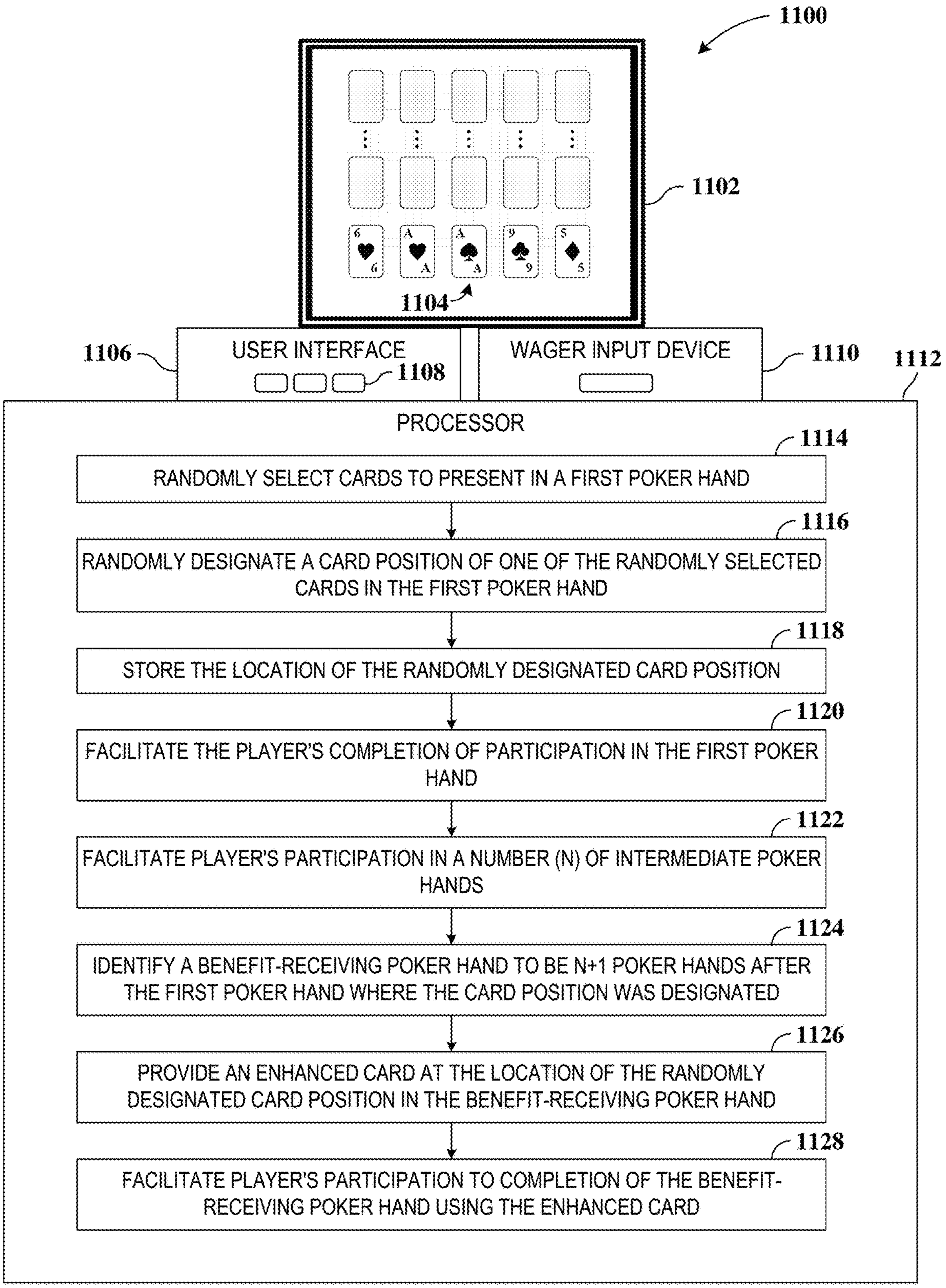
FIGS. 11A and 11B are diagrams of representative gaming apparatuses for enriching subsequent poker hands based on card position designations in prior poker hands.
Figure 11B:
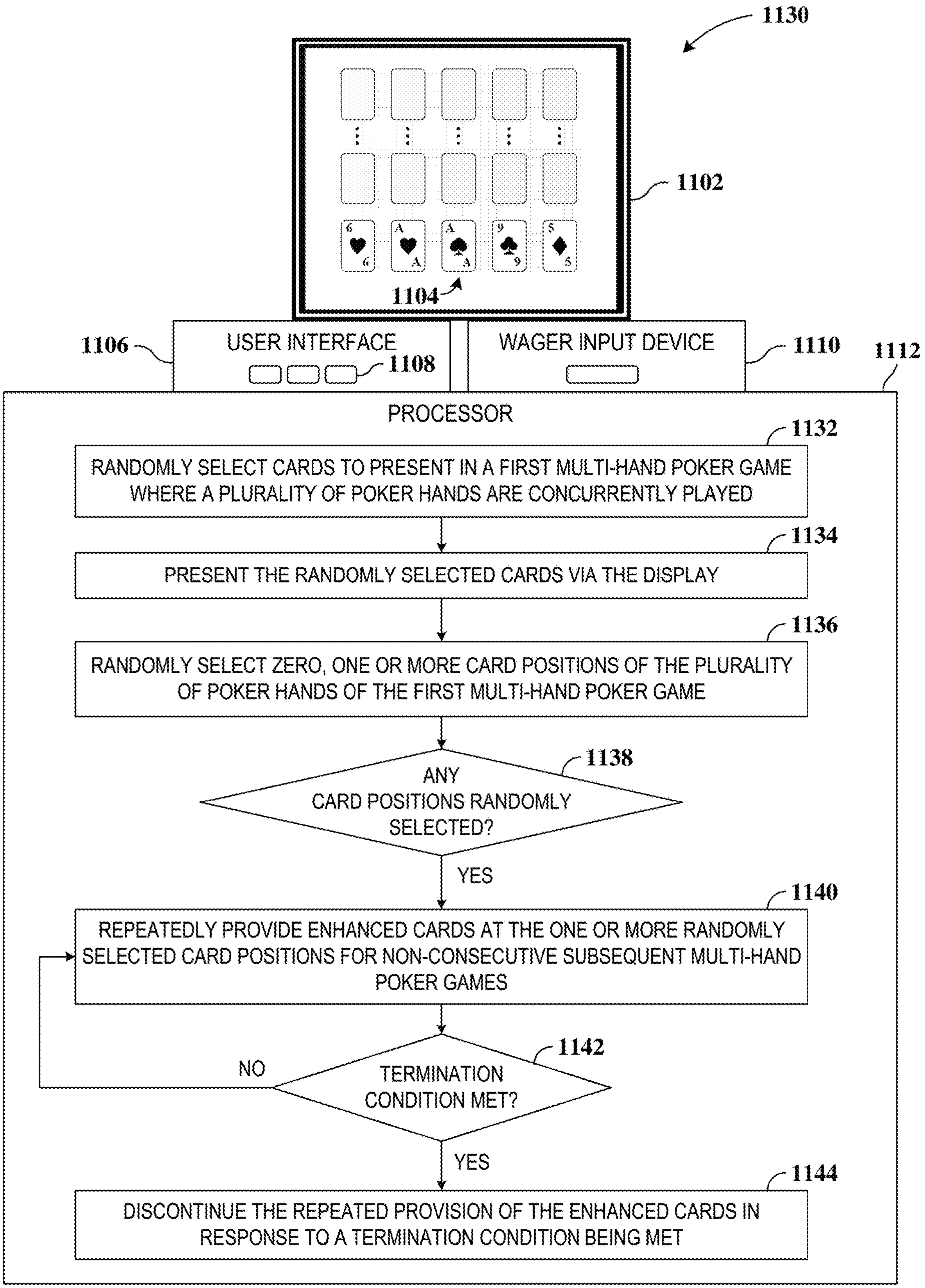

FIGS. 11A and 11B are diagrams of representative gaming apparatuses for enriching subsequent poker hands based on card position designations in prior poker hands. In the embodiment of FIG. 11A, a gaming device 1100 for playing a poker game is provided. The representative gaming device 1100 includes at least a display(s) 1102 presenting a single or multiple poker hands 1104. A user interface 1106 is provided that includes at least one user input 1108 to enable a player to initiate and participate in poker hands 1104 presented via the display 1102. A wager input device 1110 may be provided, which may be structured to identify and validate player assets and ultimately permit the player to play the poker game events when the player assets are provided. For purposes of illustration, FIG. 11A is described in terms of a single-hand poker game, although the principles are equally applicable to multi-hand poker, such as a triple-play poker game or other multi-play poker game, where multiple poker hands are presented to the player at one time, and where cards held in one hand are replicated into all of the other concurrently-played hands.

A processor 1112 is configured to, in one embodiment, randomly select 1114 cards to present in a first poker hand via the display 1102, and randomly designate 1116 a card position of one of the randomly selected cards in the first poker hand. This embodiment also contemplates randomly designating multiple card positions of respective cards in the first poker hand, thus selection of "one" does not limit this embodiment to selecting more than one. The processor 1112 may store 1118, via the digital storage, the location of the randomly designated card position, and facilitate 1120 the player's completion of participation of the first poker hand. The processor 1112 further facilitates 1122 the player's participation in a number (N) of intermediate poker hands, identifies 1124 identify a benefit-receiving poker hand to be N+1 poker hands after the first poker hand in which the card position was randomly designated, provides 1126 an enhanced card at the stored location of the randomly designated card position in the benefit-receiving poker hand, and facilitates 1128 player's participation to completion of the benefit-receiving poker hand using the enhanced card.

In the embodiment of FIG. 11B, a gaming device 1130 for playing a poker game is provided. Utilizing like reference numbers to those of FIG. 11A where applicable, the representative gaming device 1130 includes at least a display(s) 1102 presenting a single or multiple poker hands 1104. A user interface 1106 is provided that includes at least one user input 1108 to enable a player to initiate and participate in poker hands 1104 presented via the display 1102. A wager input device 1110 may be provided, which may be structured to identify and validate player assets and ultimately permit the player to play the poker game events when the player assets are provided. FIG. 11B is described in terms of a multi-hand poker game, although principles may be applicable to single-hand poker.

A processor 1112 is configured to, in one embodiment, randomly select 1132 cards to present in a first multi-hand poker game where multiple poker hands are concurrently played, and to present 1134 the randomly selected cards via the display 1102. The processor 1112 is configured to randomly select 1136 zero, one or more card positions of the multiple poker hands of the first multi-hand poker game. If, as determined at decision block 1138, one or more card positions of the multiple poker hands of the first poker game were randomly selected, then repeatedly provide 1140 enhanced cards at the randomly selected card positions for non-consecutive subsequent multi-hand poker games. If, as determined at decision block 1142, a termination condition has not been met, then the enhanced cards may continue to be repeatedly provided 1140 at the randomly selected card positions for still further subsequent poker games. When the termination condition has been met as determined at decision block 1142, the processor 1112 discontinues 1144 the repeated providing of the enhanced cards in response thereto.

The principles described herein may be applied to other games, such as keno, bingo, etc. For example, in the context of keno, particular number positions (whether associated with positions of the player's identified numbers or not) may be randomly identified, and on periodic, subsequent random selections of numbered balls (or other identification of the game play items/numbers), those number positions may be identified as wild (or other enhancement, such as repeated numbers, etc.) to act as if that associated number was one of the random selections, even if it was not. Similar examples apply to bingo, where a bingo card position may be marked, and later bingo games treat the marked position as a free space (similar to the middle position in many bingo games). These and other applications of the enhancement features described herein may be employed.

The foregoing description of the representative embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention covers alternatives, modifications, and equivalents that come within the scope and spirit of the principles set out herein and/or in the appended claims.

What is claimed is:

1. A gaming apparatus for facilitating player participation in electronic poker games, the gaming apparatus comprising:

a video display operable to display a game play grid having a plurality of card positions;

digital storage configured to store a plurality of virtual cards;

a user interface configured to receive at least player input to facilitate player participation in the poker game;

a wager input device structured to identify and validate player assets, and to permit the player to participate in the electronic poker games in which the player assets are provided;

a processor configured to:

randomly select cards from the plurality of virtual cards to present in at least some of the plurality of card positions to form a first poker hand via the video display;

randomly designate a card position among the plurality of card positions on the video display having one of the randomly selected cards in the first poker hand, wherein the randomly designated card position is visually identified on the video display;

store, via the digital storage, the location of the randomly designated card position;

facilitate the player's completion of participation of the first poker hand;

facilitate the player's participation in a number (N) of intermediate poker hands;

identify a benefit-receiving poker hand to be N+1 poker hands after the first poker hand in which the card position was randomly designated;

provide an enhanced card at the stored location of the randomly designated card position in the benefit-receiving poker hand; and facilitate player's participation to completion of the benefit-receiving poker hand using the enhanced card.

2. The gaming apparatus of claim 1, wherein the processor is configured to repeatedly provide the enhanced card at the stored location of the randomly designated card position on every N+1 poker hands.

3. The gaming apparatus of claim 2, wherein the processor is configured to discontinue repeatedly providing the enhanced card in response to occurrence of a termination event.

4. The gaming apparatus of claim 1, wherein the processor is configured to facilitate player's participation in the N intermediate poker hands while providing no enhanced card at the card position randomly designated during play of the first poker hand.

5. The gaming apparatus of claim 1, wherein the processor is further configured to:

randomly designate one or more additional card positions of respective ones of the randomly selected cards in the first poker hand;

store, via the digital storage, the locations of the randomly designated one or more additional card positions;

provide additional ones of the enhanced card at the stored locations of the randomly designated one or more additional card positions in the benefit-receiving poker hand; and facilitate the player's participation to completion of the benefit-receiving poker hand using the enhanced card and the additional ones of the enhanced card.

6. The gaming apparatus of claim 5, wherein the processor is configured to repeatedly provide the enhanced card and the additional ones of the enhanced card at their respective randomly designated card position and the randomly designated one or more additional card positions on every N+1 poker hands.

7. The gaming apparatus of claim 1, wherein the processor is configured to:

facilitate the player's participation in the number (N) of intermediate poker hands by facilitating the player's participation in a fixed number of intermediate poker hands; and repeatedly provide the enhanced card at the stored location of the randomly designated card position periodically, after every fixed number of intermediate poker hands, until an occurrence of a termination event.

8. The gaming apparatus of claim 1, wherein the processor is configured to:

facilitate the player's participation in the number (N) of intermediate poker hands by facilitating the player's participation in a random number of intermediate poker hands; and repeatedly provide the enhanced card at the stored location of the randomly designated card position, after every random number of intermediate poker hands, until an occurrence of a termination event.

9. The gaming apparatus of claim 1, wherein the processor is configured to randomly designate the card position of one of the randomly selected cards in the first poker hand at any time during play of the first poker hand ranging from before the cards are presented in the first poker hand via the video display through after facilitation of the player's completion of participation of the first poker hand.

10. The gaming apparatus of claim 1, wherein the processor is configured to provide a wild card as the enhanced card at the stored location of the randomly designated card position in the benefit-receiving poker hand, and to facilitate the player's participation to completion of the benefit-receiving poker hand using the wild card.

11. The gaming apparatus of claim 1, wherein the processor is configured to additionally provide the enhanced card to the randomly designated card position of the first poker hand.

12. A gaming apparatus for facilitating player participation in electronic poker games, the gaming apparatus comprising:

a video display operable to display a plurality of card positions;

a user interface configured to receive at least player input to facilitate player participation in the poker game;

a wager input device structured to identify and validate player assets, and to permit the player to participate in the electronic poker games in which the player assets are provided;

a processor configured to:

randomly select cards to present in a first multi-hand poker game where a plurality of poker hands are concurrently played, and present the randomly selected cards via the video display;

randomly select zero, one or more of the plurality of card positions of the plurality of poker hands of the first multi-hand poker game, wherein any randomly selected card positions are visually identified on the video display;

if one or more card positions of the plurality of poker hands of the first multi-hand poker game was randomly selected, repeatedly provide enhanced cards at the one or more randomly selected card positions for non-consecutive subsequent multi-hand poker games; and discontinue the repeated providing of the enhanced cards in response to a termination condition being met.

13. The gaming apparatus of claim 12, wherein the processor is configured to, if one or more card positions of the plurality of poker hands of the first multi-hand poker game were randomly selected, repeatedly provide enhanced cards at the one or more card positions of the plurality of poker hands every Nth multi-hand poker game, where N is greater than one.

14. The gaming apparatus of claim 12, wherein the processor is configured to, if one or more card positions of the plurality of poker hands of the first multi-hand poker game were randomly selected, repeatedly provide enhanced cards at the one or more card positions of the poker hands of the non-consecutive subsequent multi-hand poker games with a random number of intermediate multi-hand poker games between those of the multi-hand poker games receiving the enhanced cards, until the termination condition is met.

15. The gaming apparatus of claim 12, wherein the processor is configured to additionally provide the enhanced cards to the randomly selected card positions of the plurality of poker hands of the first multi-hand poker game.

16. The gaming apparatus of claim 12, wherein the processor is configured to provide wild cards as the enhanced cards at the one or more randomly selected card positions.

17. The gaming apparatus of claim 12, wherein at least the first multi-poker game and the non-consecutive subsequent multi-hand poker games involve multi-play poker games where the cards held by the player via the user interface for one of the plurality of poker hands are replicated into the remaining ones of the plurality of poker hands, and the cards that were not held or replicated are discarded in favor of replacement cards.

18. The gaming apparatus of claim 12, wherein the termination condition comprises a random termination indication.

19. The gaming apparatus of claim 12, wherein the termination condition comprises a condition based on the player's play of at least the subsequent poker games.

20. The gaming apparatus of claim 12, wherein the processor is configured to randomly select zero, one or more card positions of the plurality of poker hands of the first multi-hand poker game at any time during play of the first multi-hand poker game, ranging from before the cards are presented in the first multi-hand poker game through completion of play of the first multi-hand poker game.

* * * * *